(12) United States Patent
Yamashita et al.

(10) Patent No.: US 12,210,025 B2
(45) Date of Patent: Jan. 28, 2025

(54) INTERLOCK UNIT AND AUTOMATED ANALYZER EQUIPPED WITH SAME

(71) Applicant: HITACHI HIGH-TECH CORPORATION, Tokyo (JP)

(72) Inventors: Taichiro Yamashita, Tokyo (JP); Tsukasa Suenari, Tokyo (JP); Takenori Okusa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 786 days.

(21) Appl. No.: 17/601,570

(22) PCT Filed: Feb. 13, 2020

(86) PCT No.: PCT/JP2020/005499
§ 371 (c)(1),
(2) Date: Oct. 5, 2021

(87) PCT Pub. No.: WO2020/208934
PCT Pub. Date: Oct. 15, 2020

(65) Prior Publication Data
US 2022/0206022 A1 Jun. 30, 2022

(30) Foreign Application Priority Data
Apr. 11, 2019 (JP) .................. 2019-075375

(51) Int. Cl.
*E05B 65/52* (2006.01)
*E05B 47/00* (2006.01)
(Continued)

(52) U.S. Cl.
CPC ......... *G01N 35/00* (2013.01); *E05B 47/0006* (2013.01); *E05B 65/5276* (2013.01);
(Continued)

(58) Field of Classification Search
CPC ......... G01N 35/00; G01N 2035/00306; G01N 2035/00316; B01L 3/5055;
(Continued)

(56) References Cited

U.S. PATENT DOCUMENTS 11,927,032 B2 * 3/2024 Yamashita .......... E05B 47/0002
2013/0084212 A1 4/2013 Kurono et al.
(Continued)

FOREIGN PATENT DOCUMENTS

JP S57-114851 A 7/1982
JP 10-048195 A 2/1998
(Continued)

OTHER PUBLICATIONS

Machine-generation of English translation (Year: 2002).*
(Continued)

*Primary Examiner* — P. Kathryn Wright
(74) *Attorney, Agent, or Firm* — Volpe Koenig

(57) ABSTRACT

An interlock unit for preventing rotation from a closed position of a cover to an open position thereof, includes: a hollow case having a rectangular parallelepiped shape disposed at a position adjacent to an inner side surface of a casing, below an end part opposite to a support shaft at the closed position of the cover; an action member that is provided on an upper surface of the case, supported to be movable between a non-operating position and an operating position, and engaged with a protruding part provided on the cover at the operating position to inhibit the cover from rotating toward the open position; electromagnetic drive means provided below the action member to drive the action member; and drive connecting means for driving the action
(Continued)

member by connecting the action member and the electromagnetic drive means and transmitting an operation of the electromagnetic drive means to the action member.

5 Claims, 32 Drawing Sheets

(51) Int. Cl.
| | | |
|---|---|---|
| *G01N 35/00* | (2006.01) | |
| *G01N 35/10* | (2006.01) | |
| *G01N 37/00* | (2006.01) | |
| *G01N 35/04* | (2006.01) | |

(52) U.S. Cl.
CPC .. *G01N 35/1004* (2013.01); *E05B 2047/0016* (2013.01); *E05B 2047/0021* (2013.01); *G01N 2035/00316* (2013.01); *G01N 2035/0405* (2013.01)

(58) Field of Classification Search
CPC ......... B01L 2200/141; B01L 2300/043; B01L 2300/0609; B01L 2300/0663; E05B 65/006; E05B 2047/0018; E05B 2047/0021; E05B 2047/0076; E05B 47/0002; E05B 47/023
See application file for complete search history.

(56) References Cited

U.S. PATENT DOCUMENTS

| | | | |
|---|---|---|---|
| 2017/0239660 A1* | 8/2017 | Baleriaux | ................ B01L 1/00 |
| 2020/0191814 A1 | 6/2020 | Yamashita et al. | |
| 2021/0062553 A1 | 3/2021 | Yamashita et al. | |
| 2021/0063423 A1 | 3/2021 | Yamashita et al. | |

FOREIGN PATENT DOCUMENTS

| | | | | |
|---|---|---|---|---|
| JP | 2002079000 A | * | 3/2002 | |
| JP | 2007-091128 A | | 4/2007 | |
| JP | 2009287997 A | * | 12/2009 | |
| JP | 2013-076678 A | | 4/2013 | |
| JP | 2019-203723 A | | 11/2019 | |
| WO | 2018/168613 A1 | | 9/2018 | |
| WO | WO-2018230198 A1 | * | 12/2018 | ............ G01N 35/00 |
| WO | 2019/054002 A1 | | 3/2019 | |

OTHER PUBLICATIONS

Machine-generation of English translation (Year: 2009).*
International Search Report, PCT/JP2020/005499, Apr. 21, 2020, 2 pgs.
European Search Report issued on Nov. 18, 2022 for European Patent Application No. 20788466.9.

* cited by examiner

[FIG. 1]
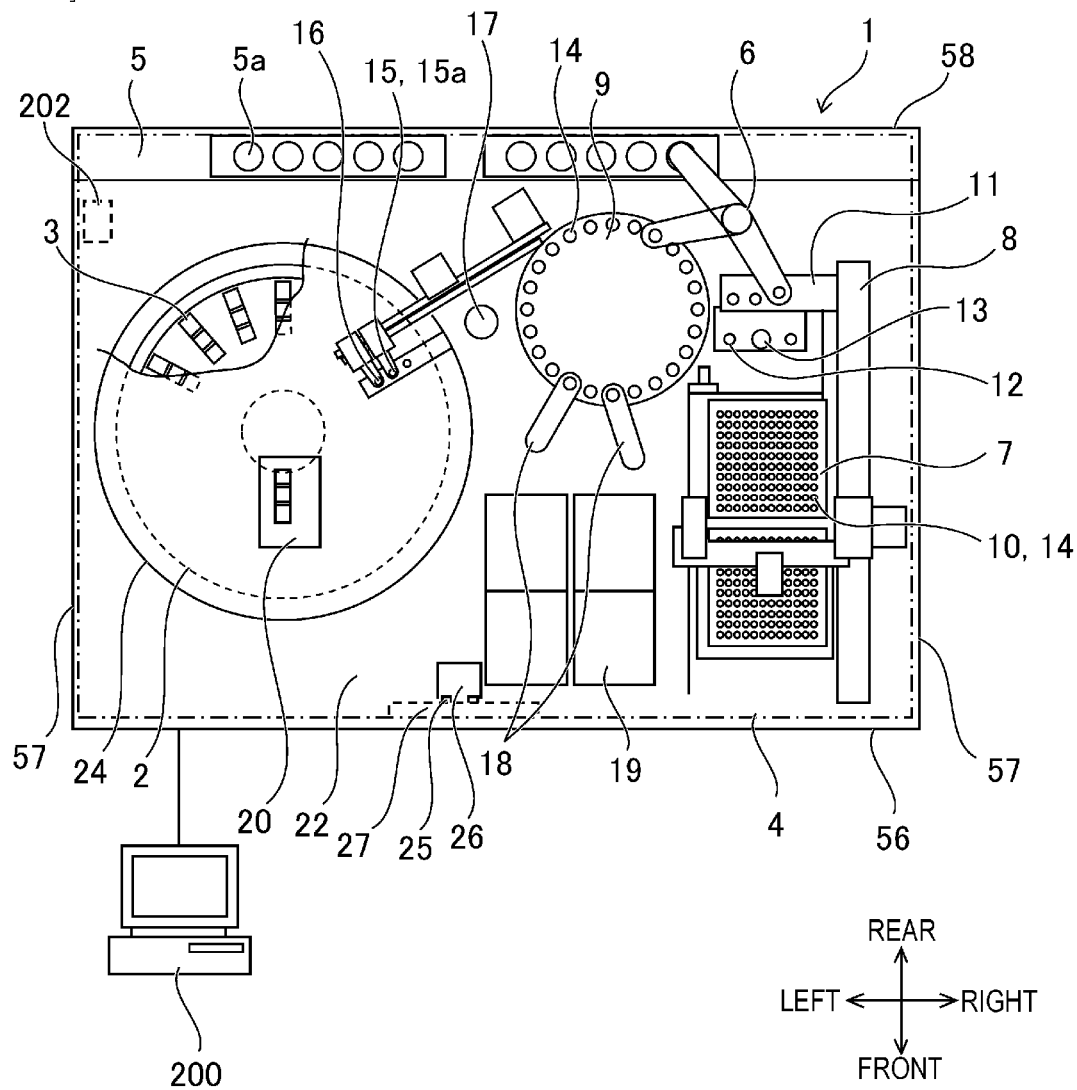

[FIG. 2]
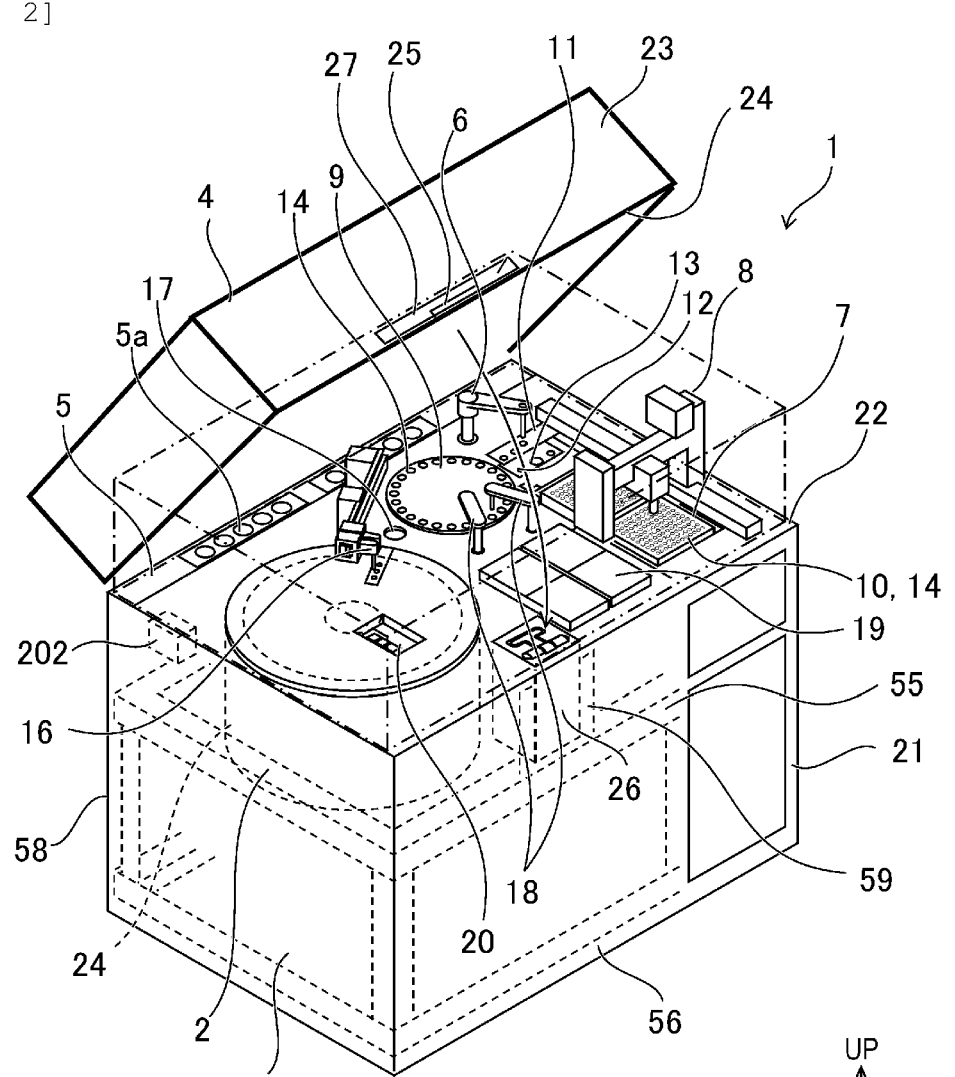
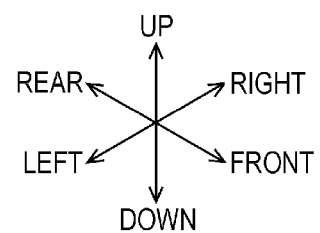

[FIG. 3]
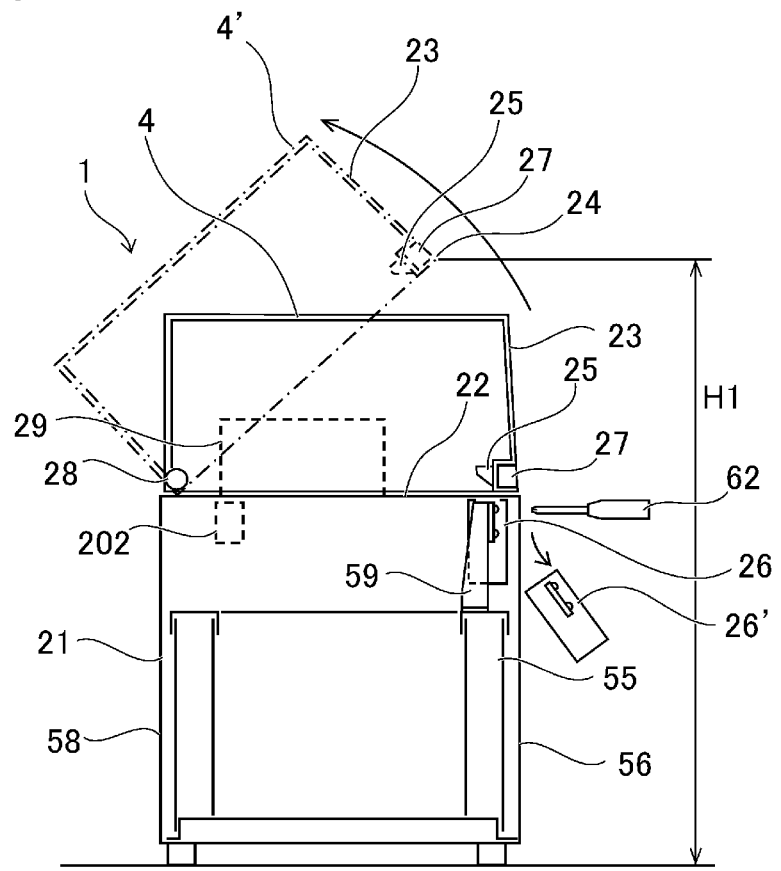
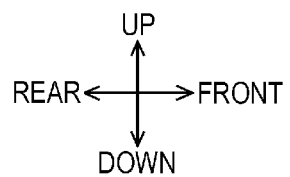

[FIG. 4]
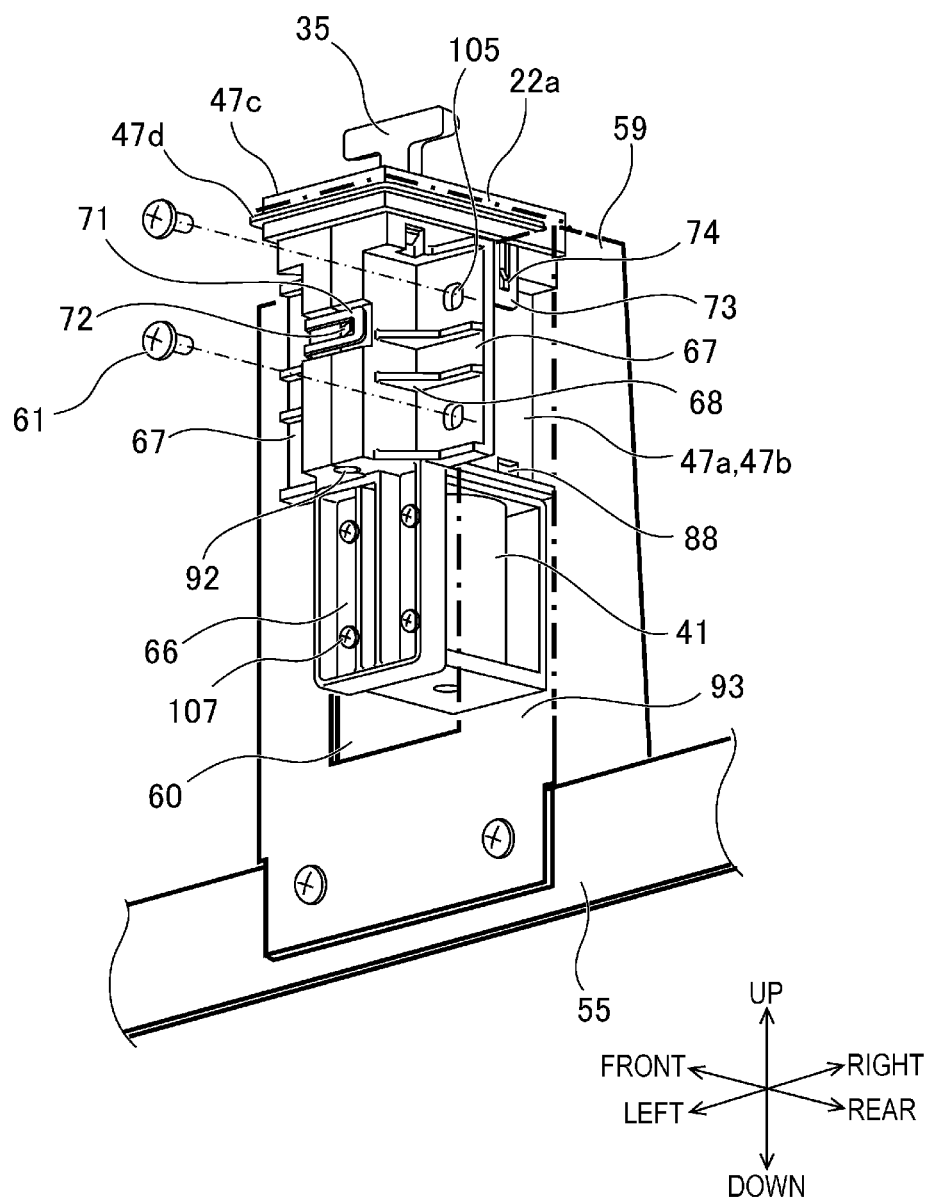

[FIG. 5A]
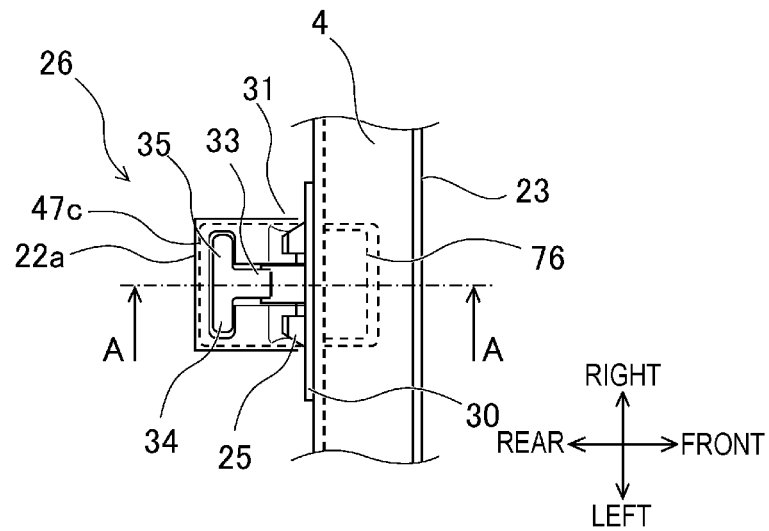
[FIG. 5B]
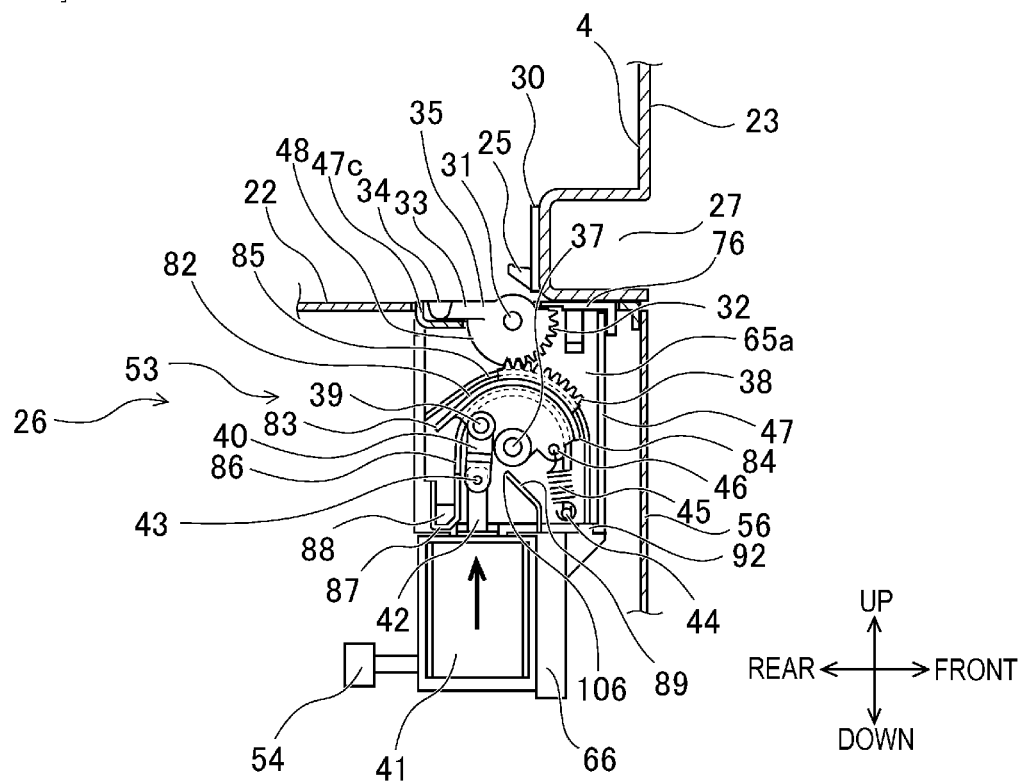

[FIG. 6]
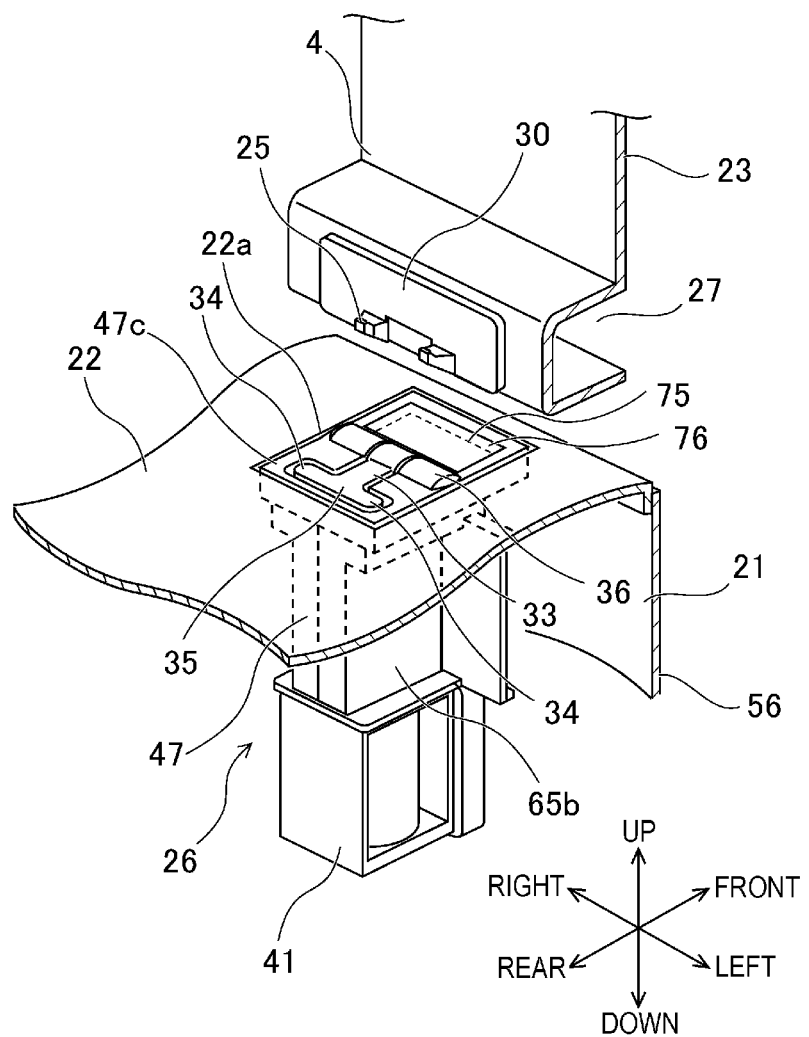

[FIG. 7]
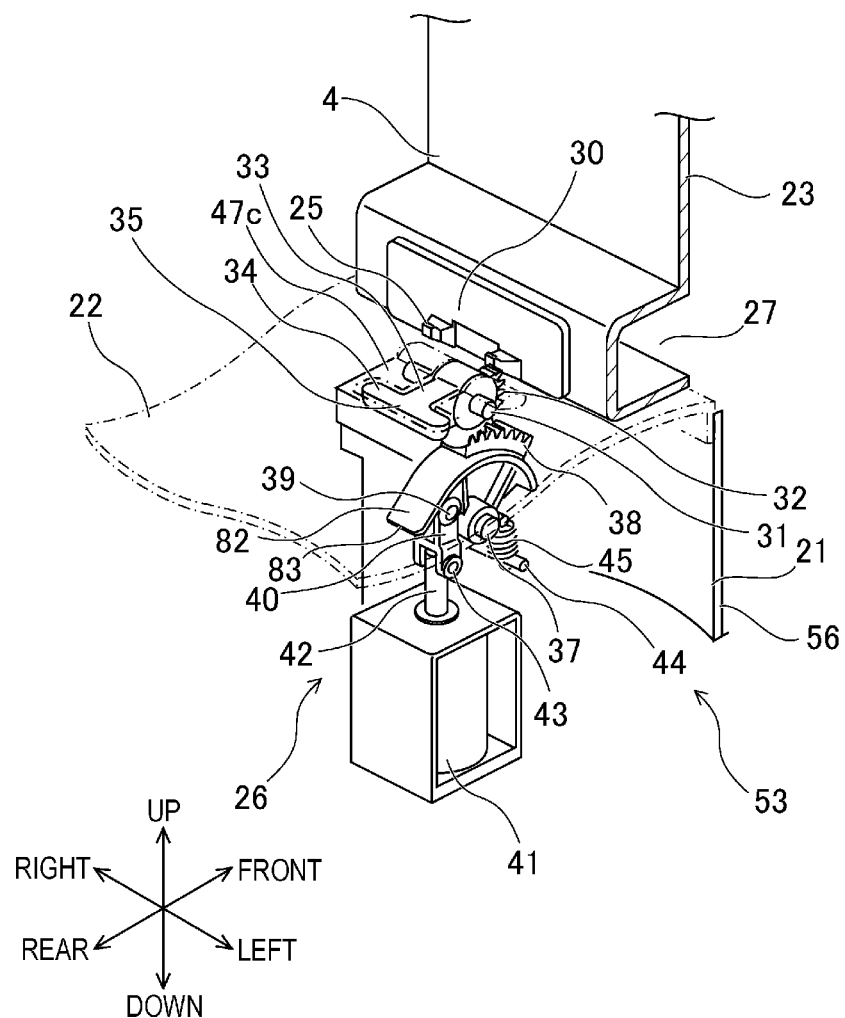

[FIG. 8]
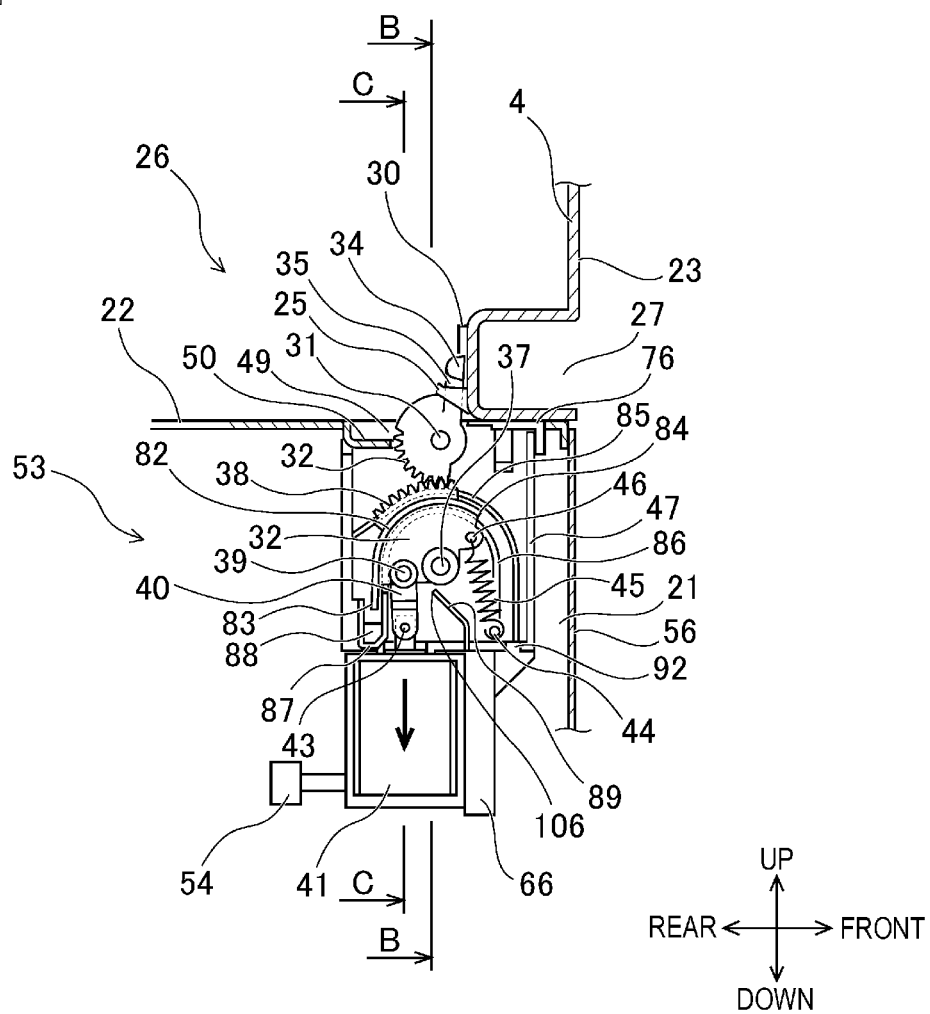

[FIG. 9]
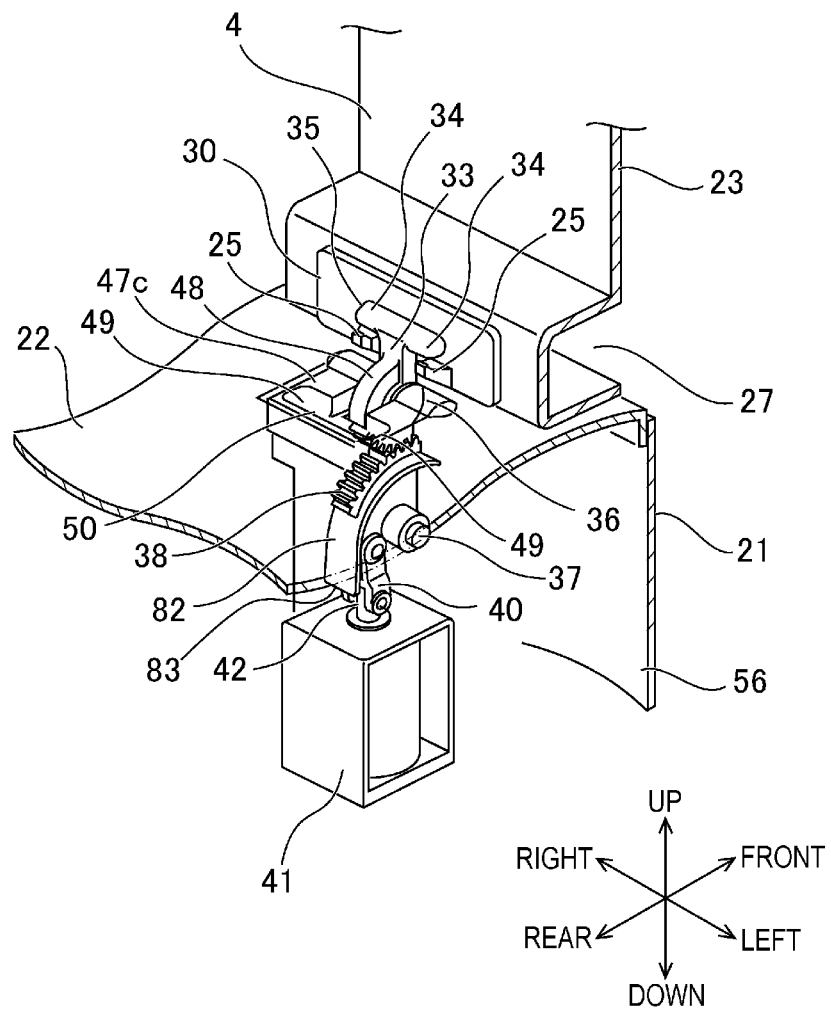

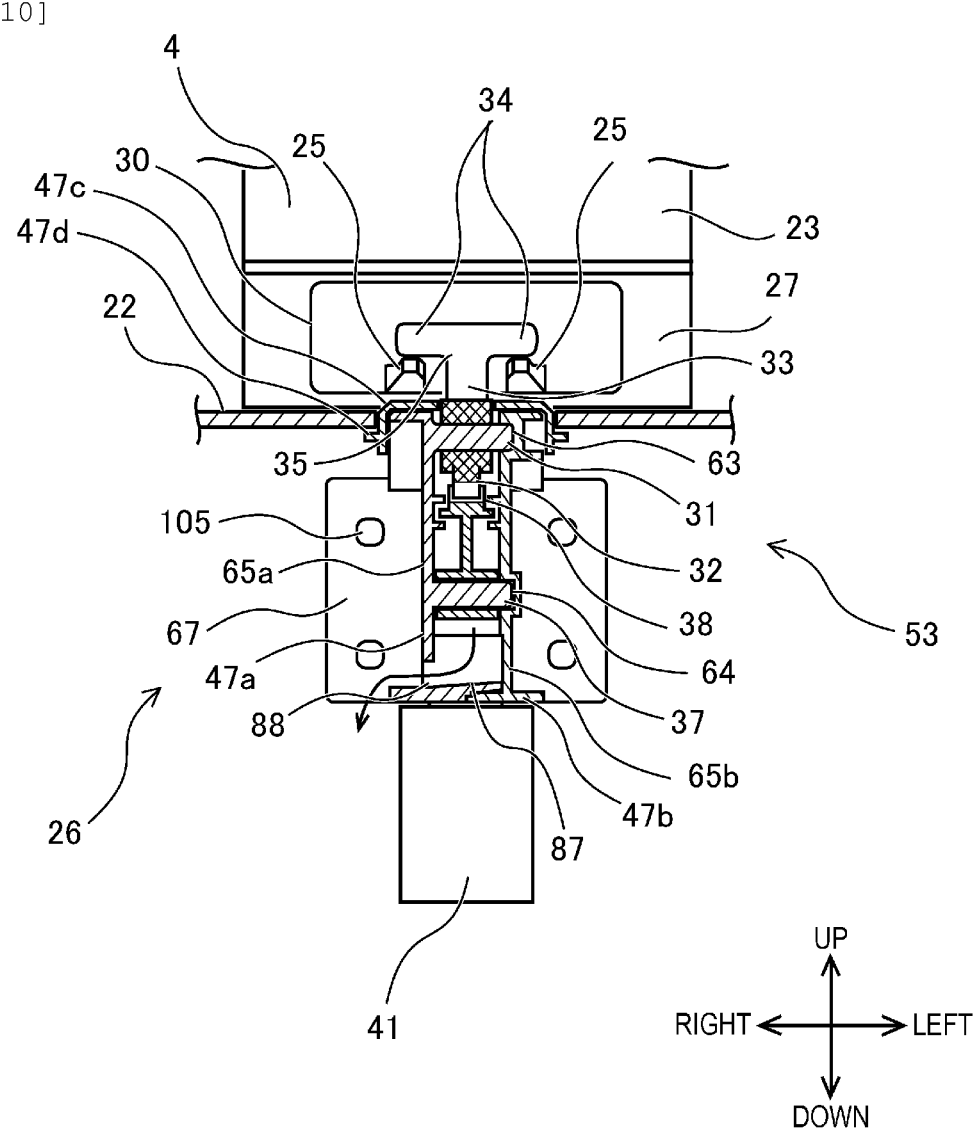
[FIG. 10]

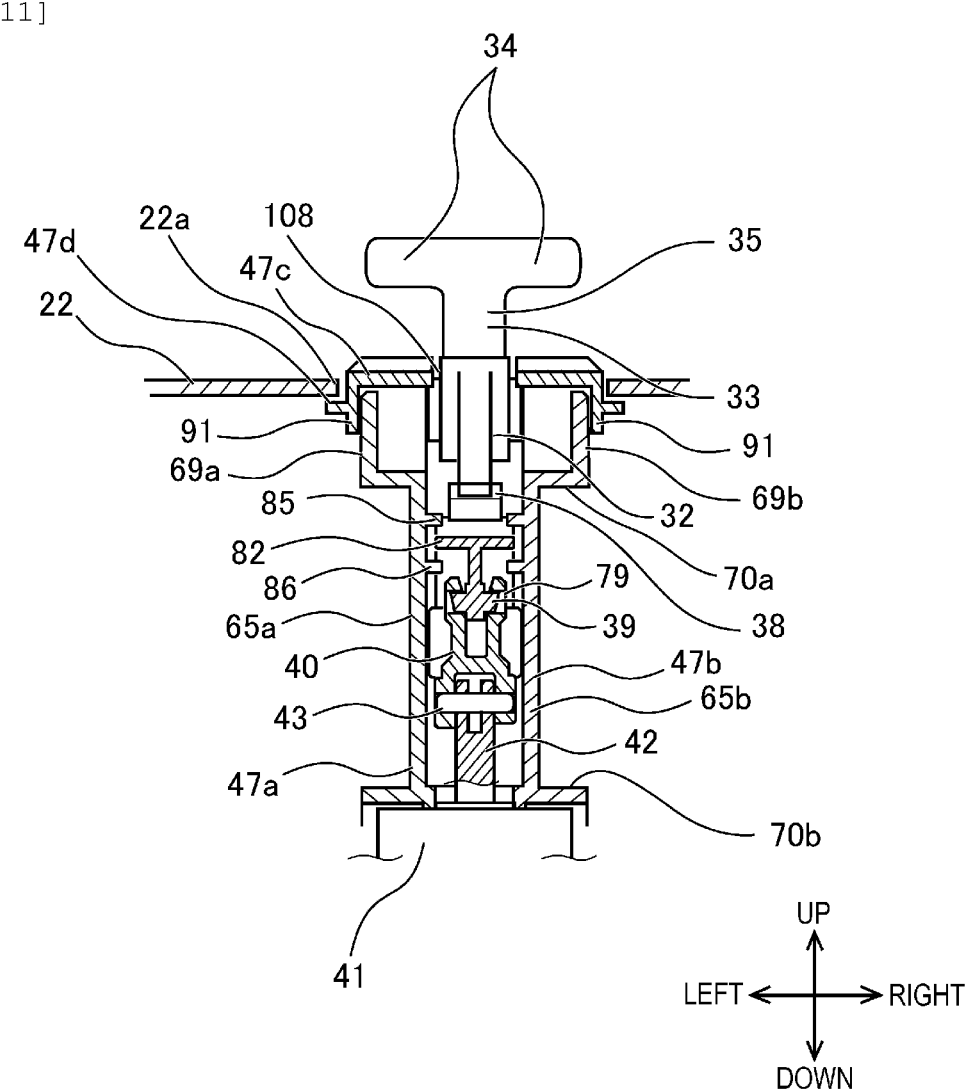
[FIG. 11]

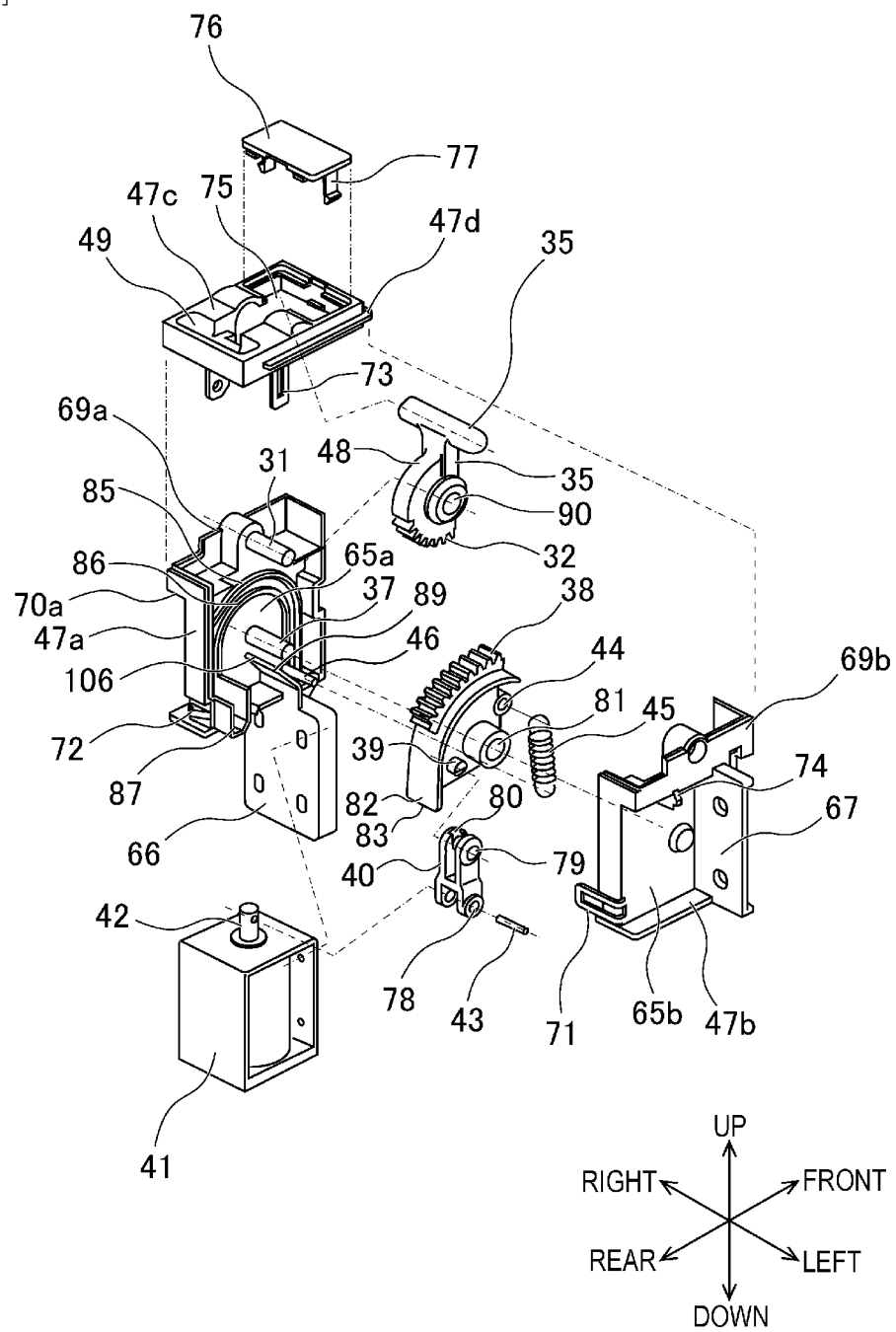
[FIG. 12]

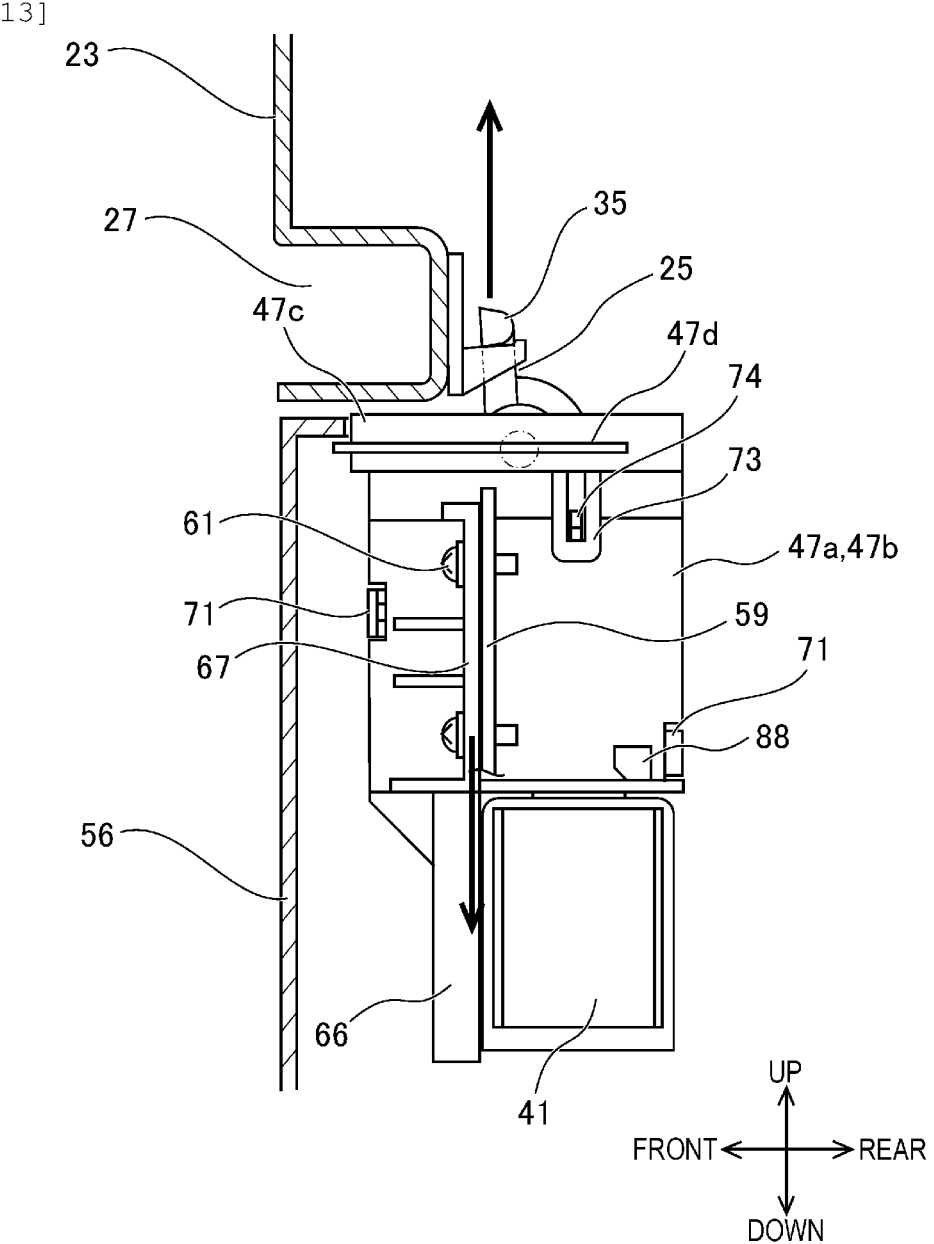
[FIG. 13]

[FIG. 14]
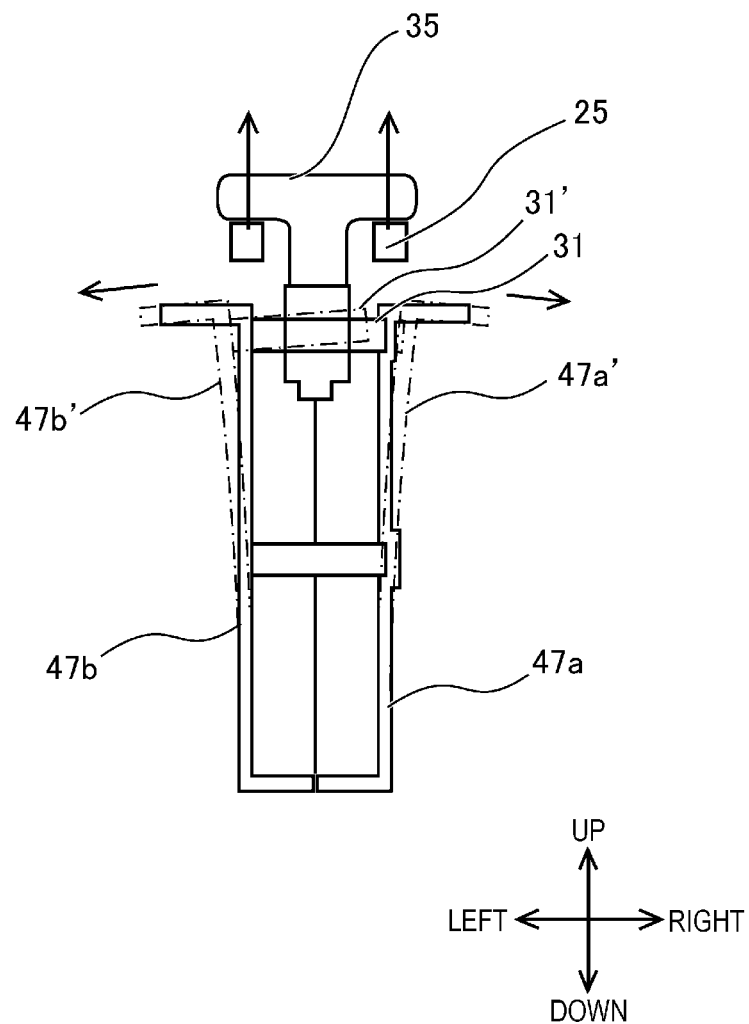

[FIG. 15]
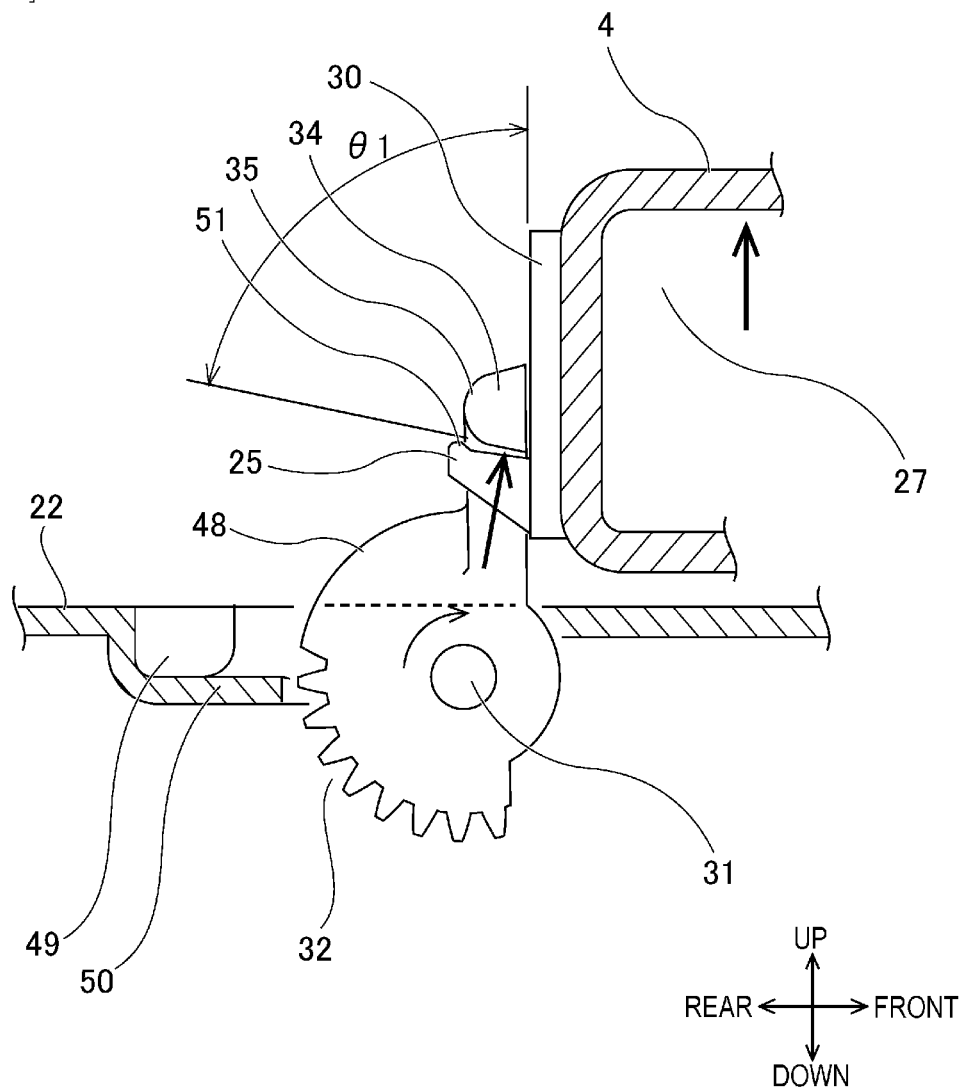

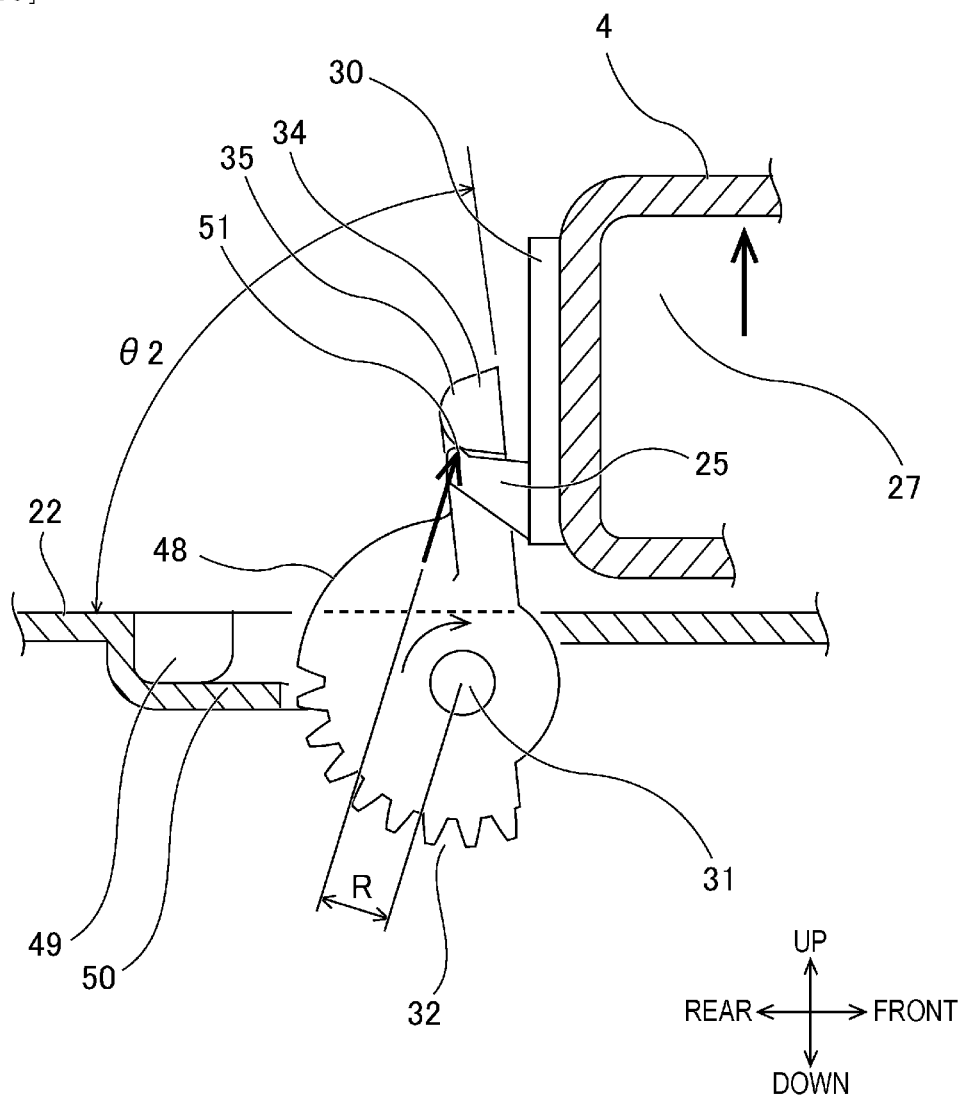
[FIG. 16]

[FIG. 17A]
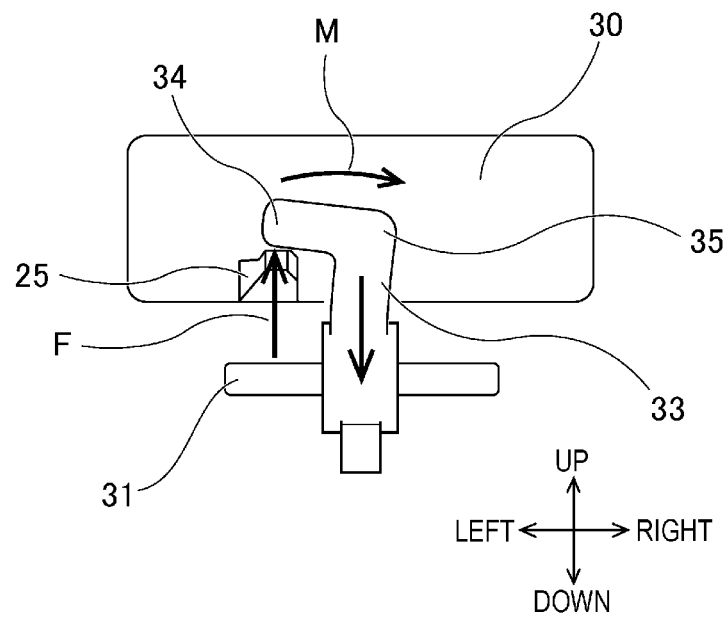
[FIG. 17B]
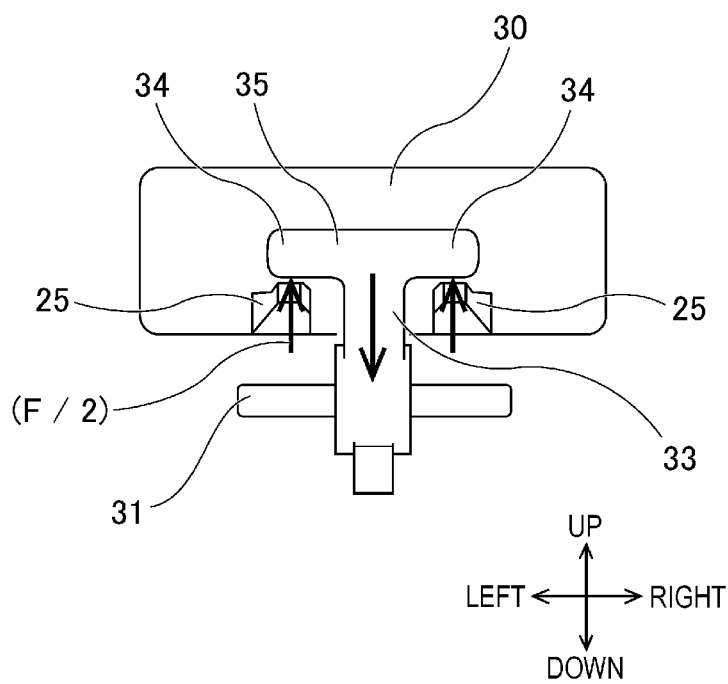

[FIG. 18A]
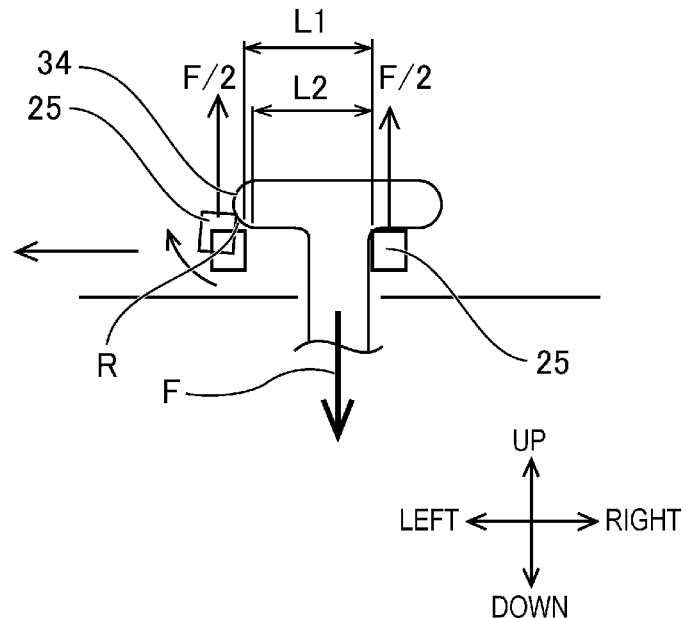
[FIG. 18B]
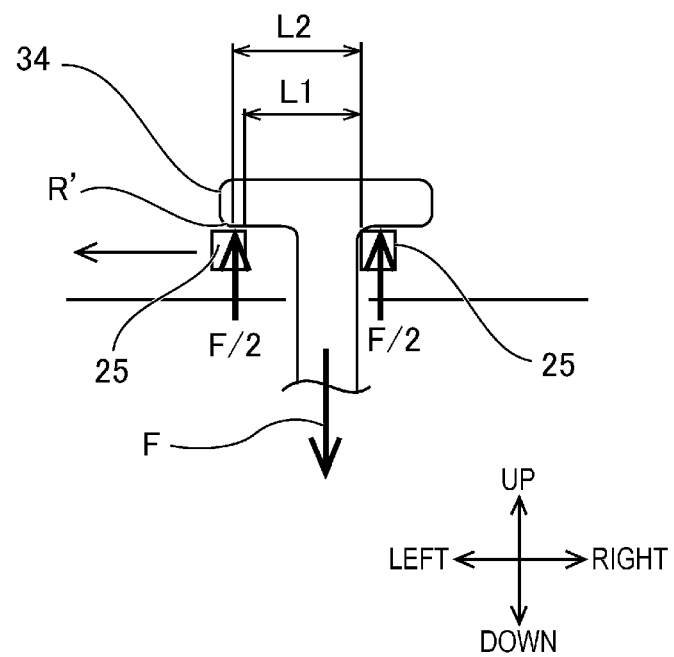

[FIG. 19]
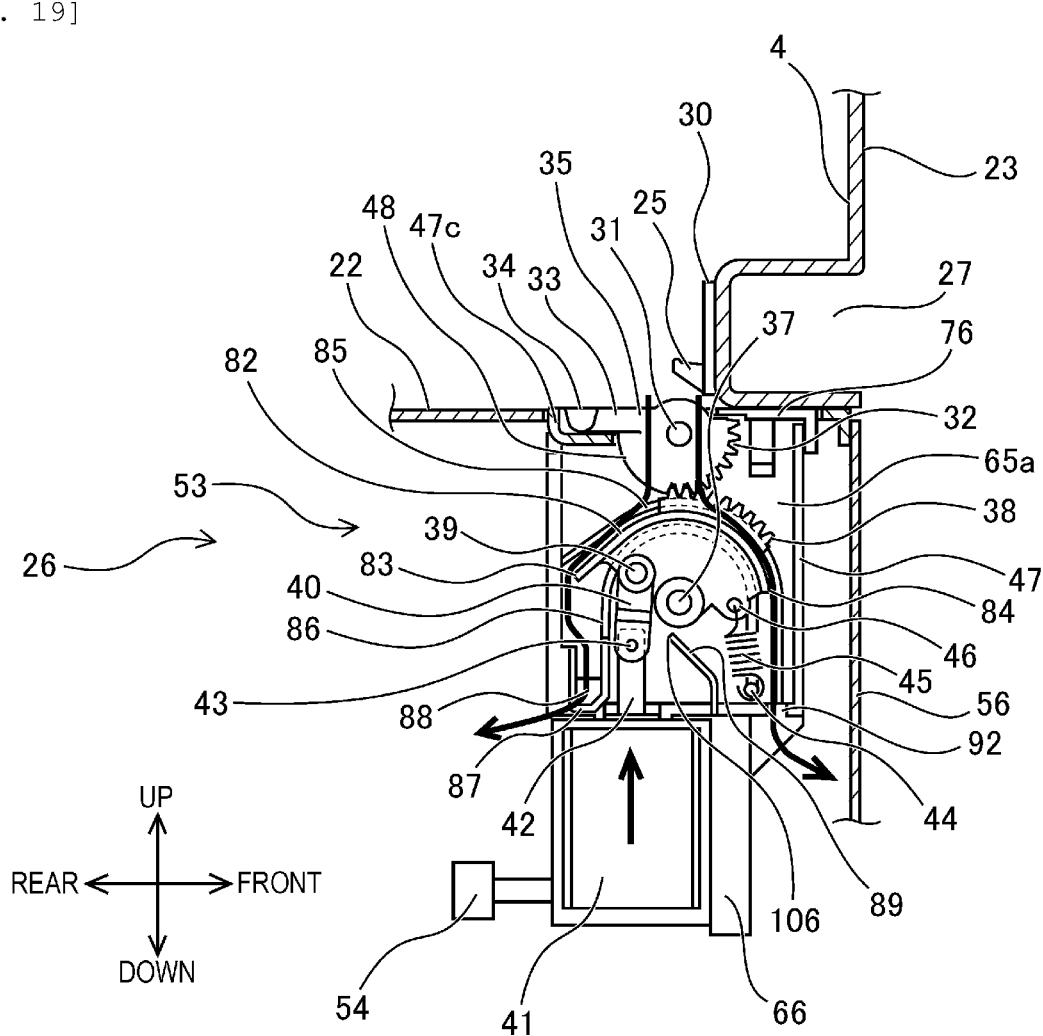

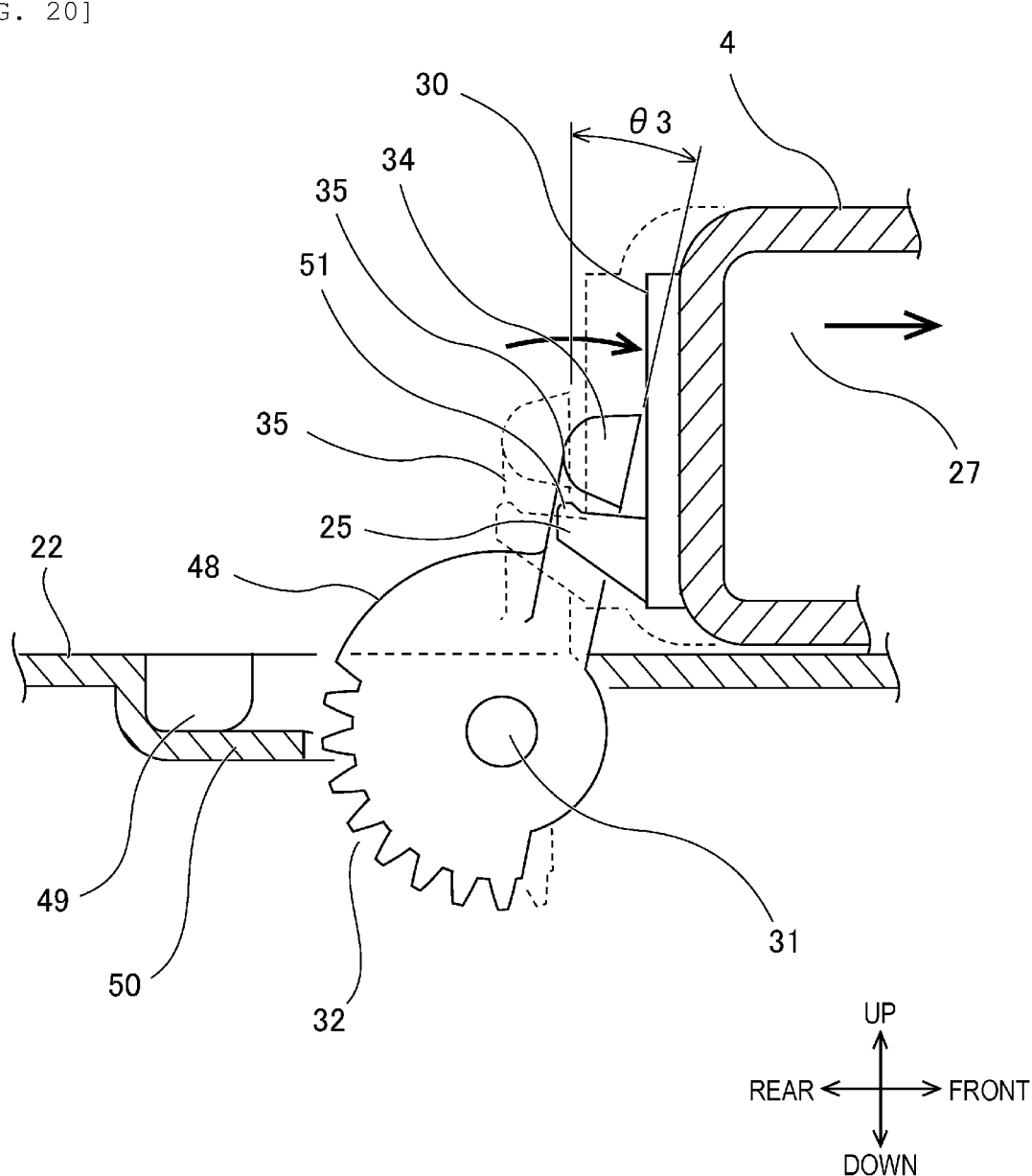
[FIG. 20]

[FIG. 21]
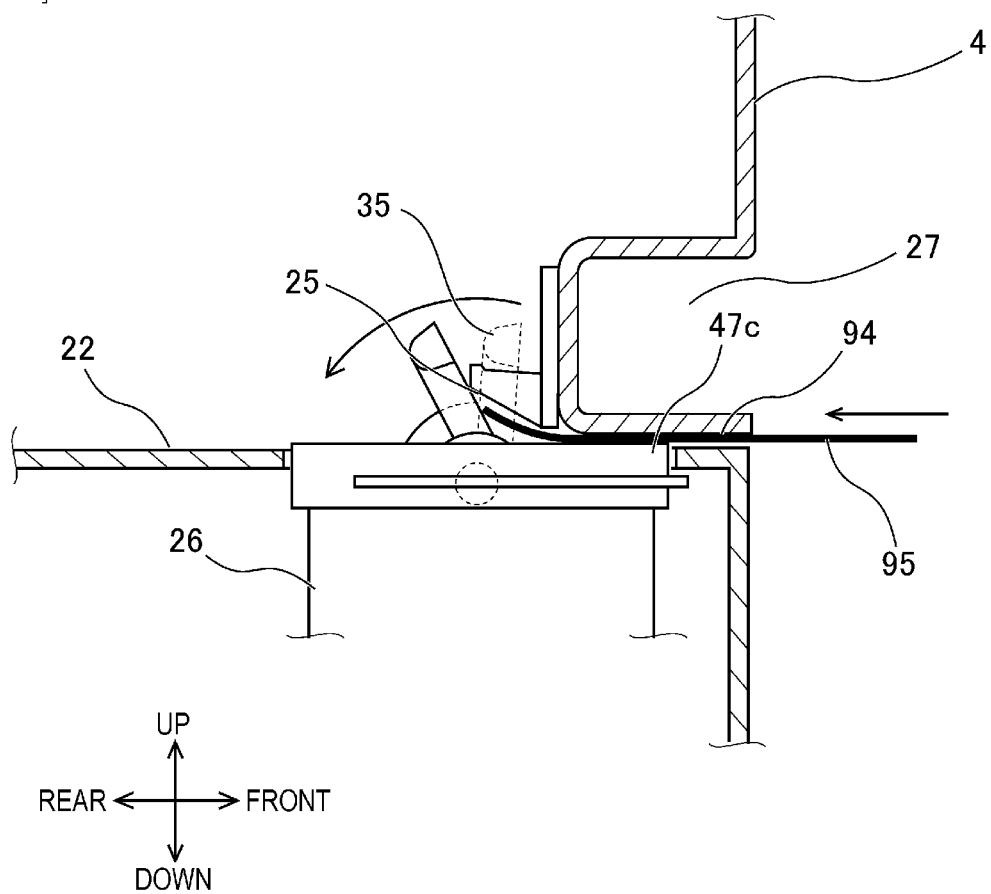

[FIG. 22]
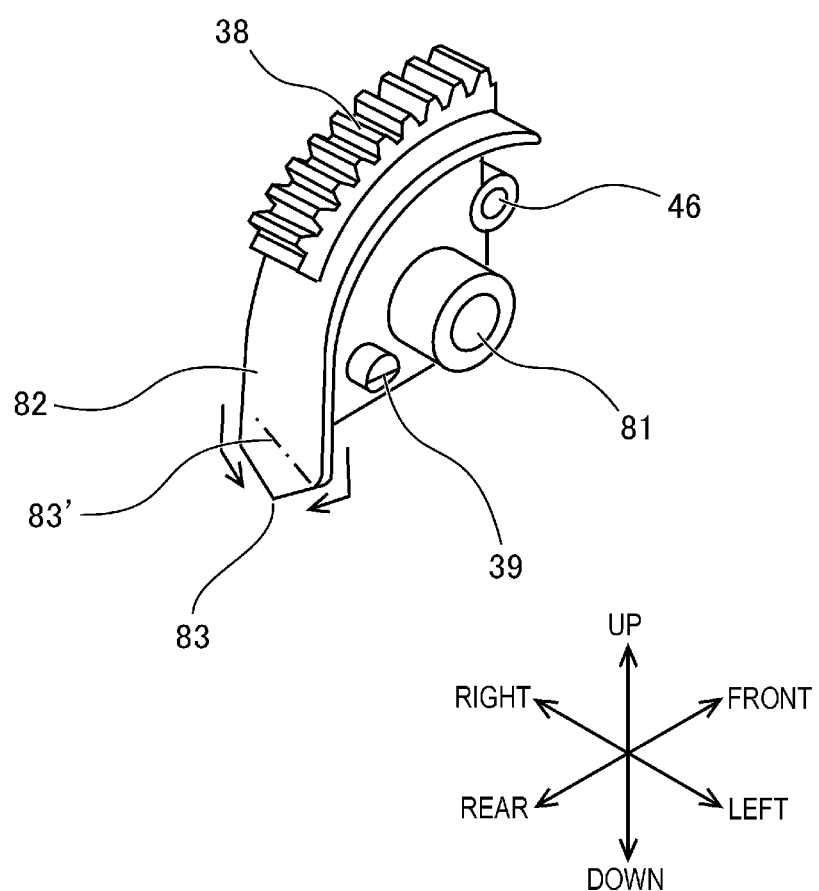

[FIG. 23]
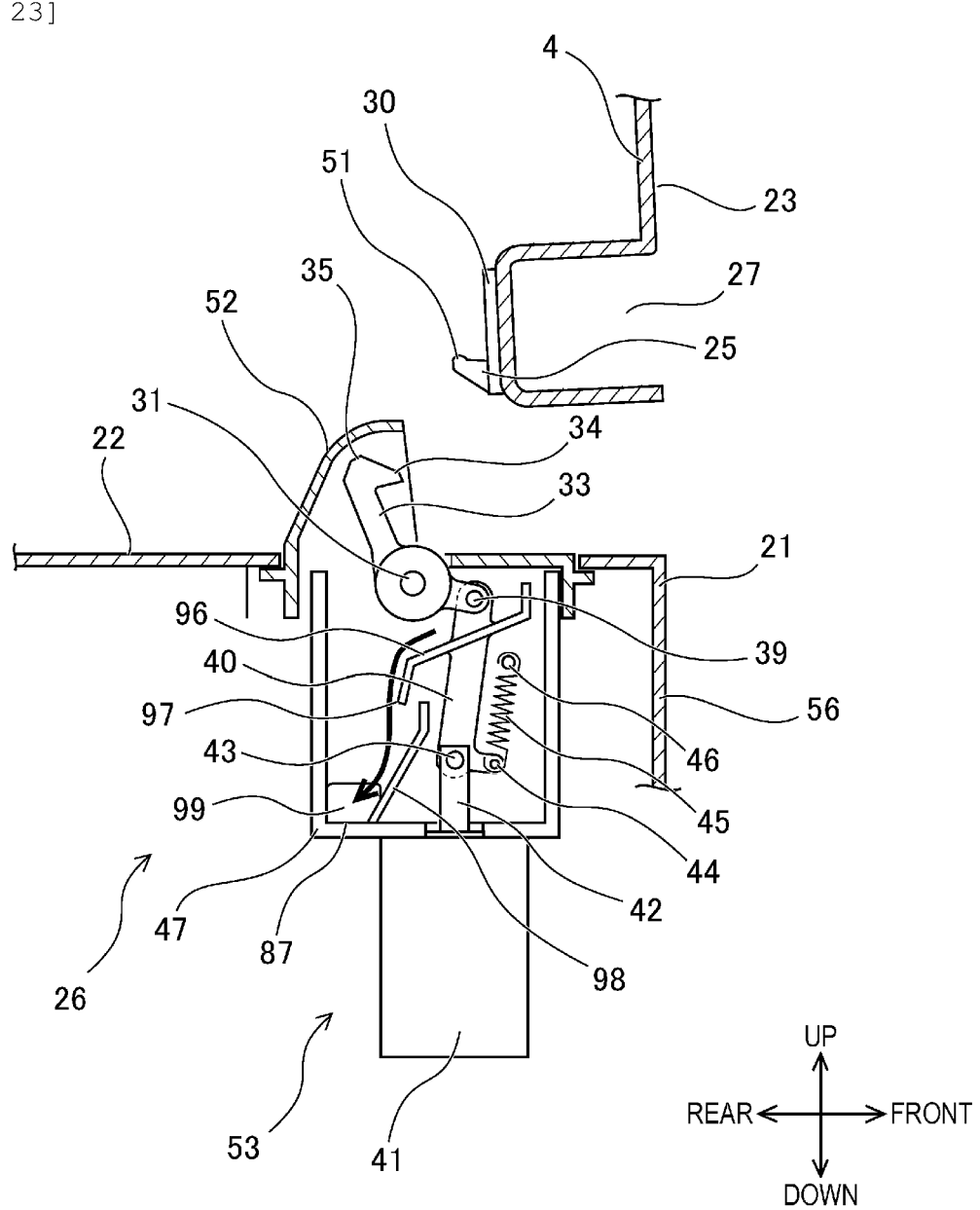

[FIG. 24]
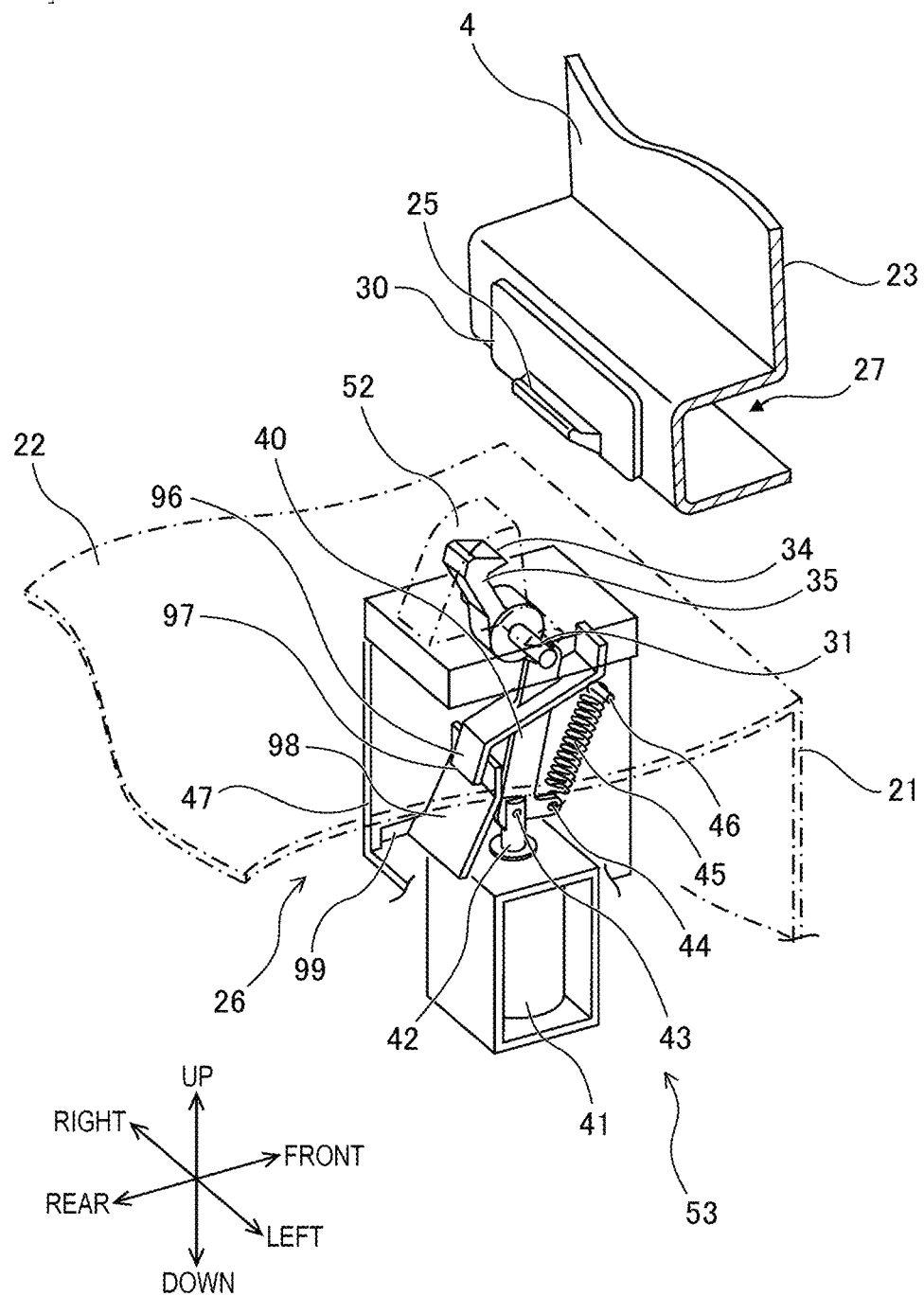

[FIG. 25]
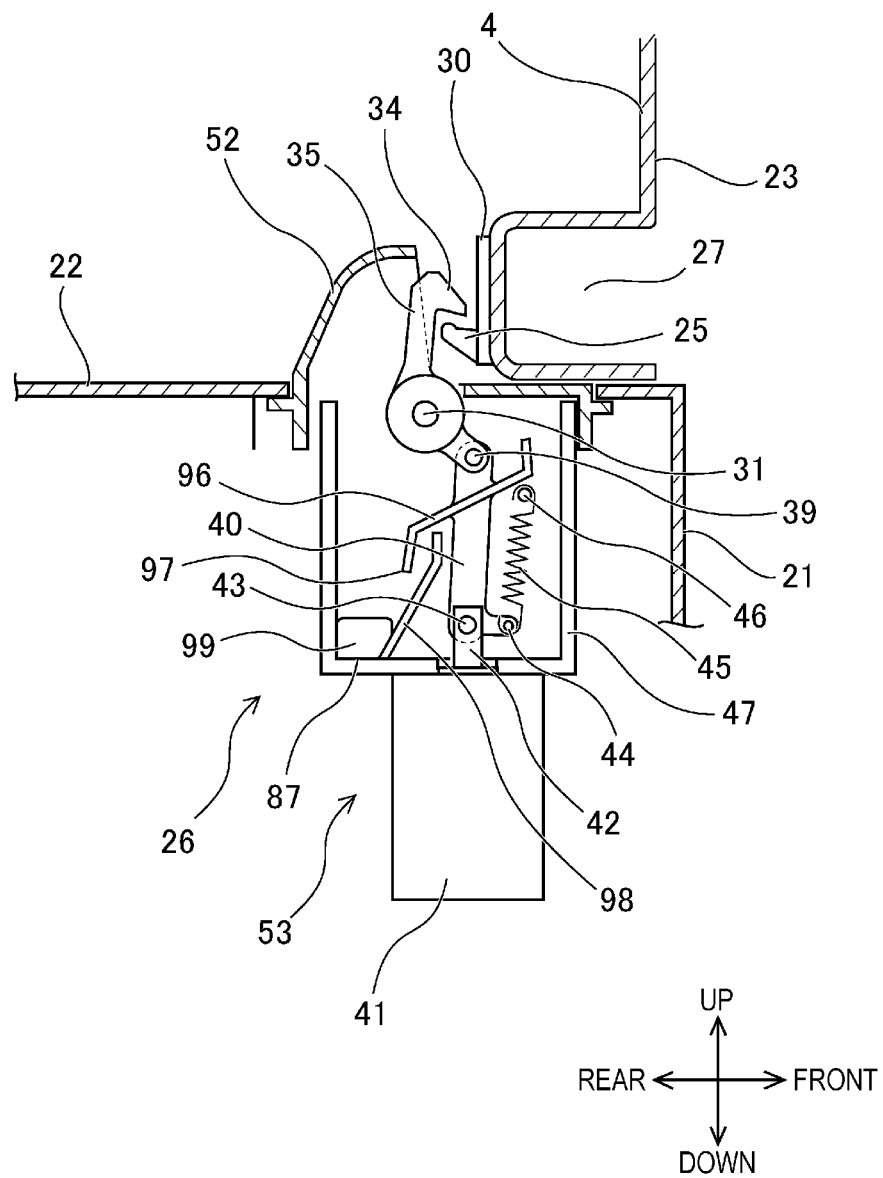

[FIG. 26]
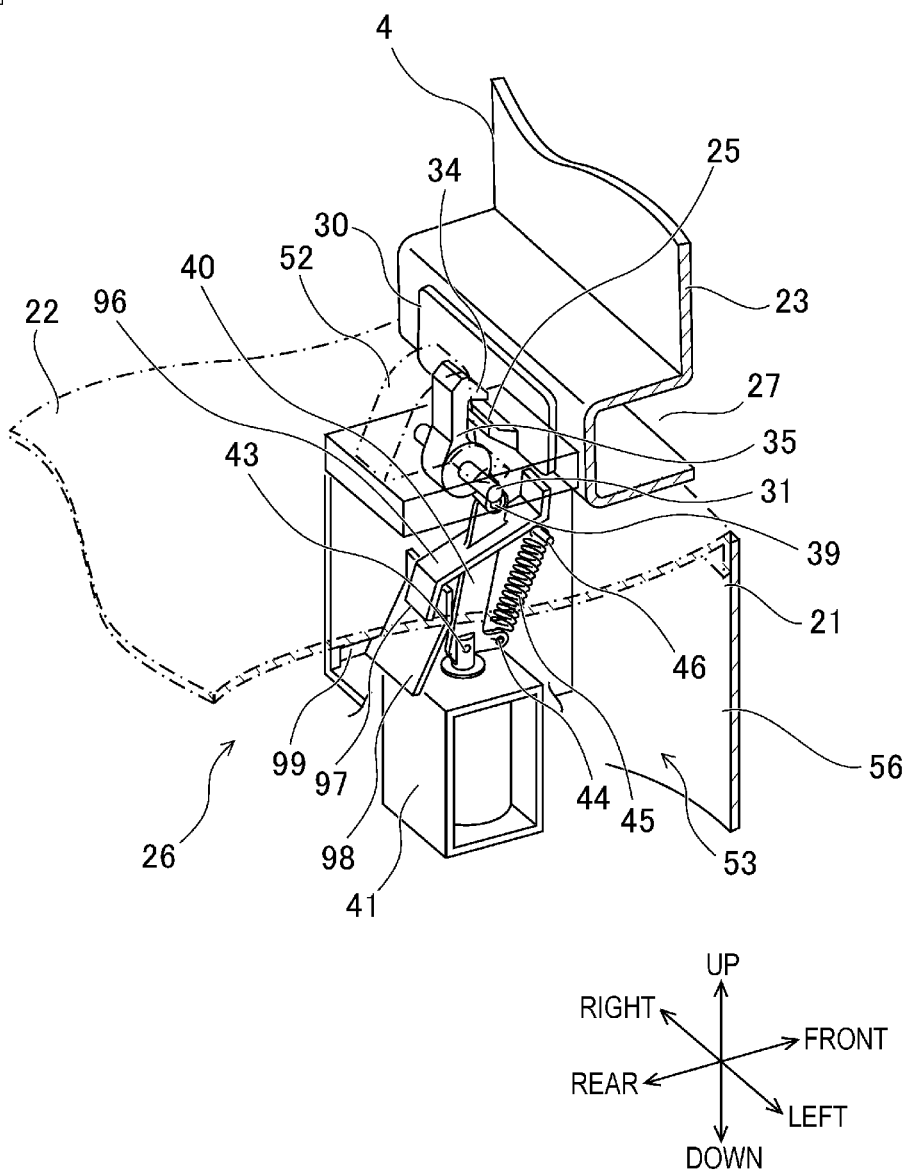

[FIG. 27A]
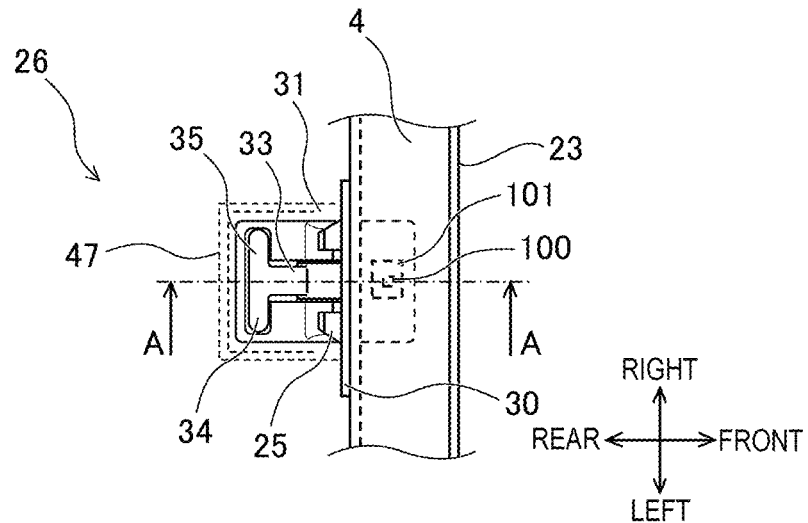
[FIG. 27B]
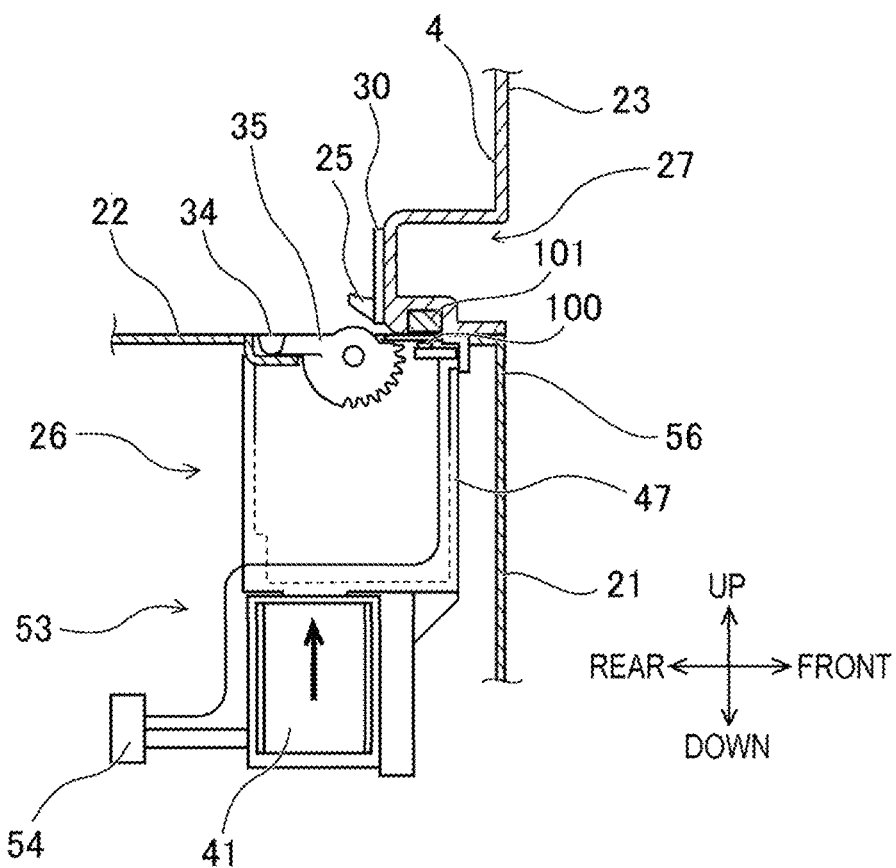

[FIG. 28]
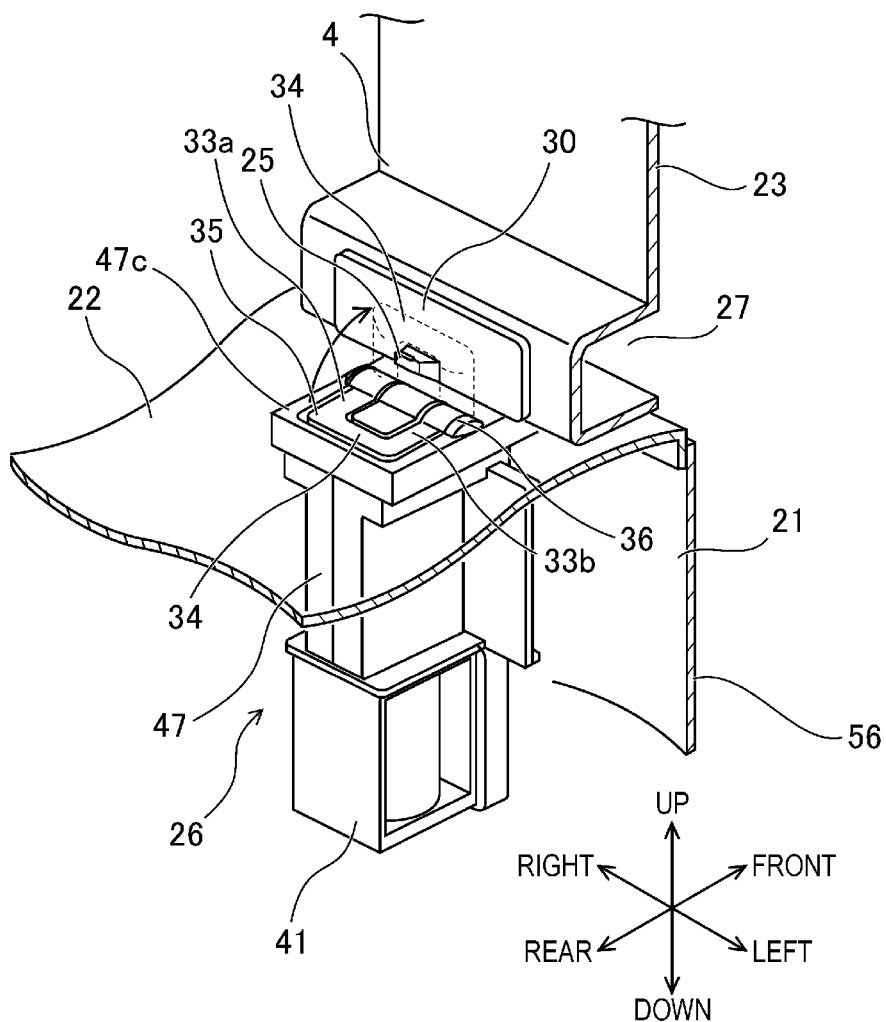

[FIG. 29A]
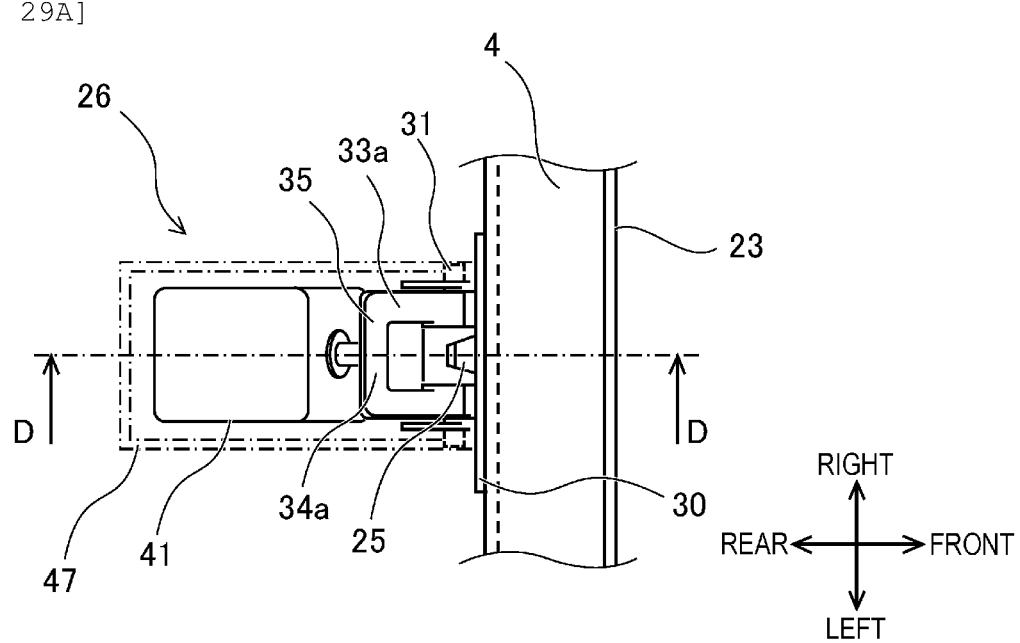
[FIG. 29B]
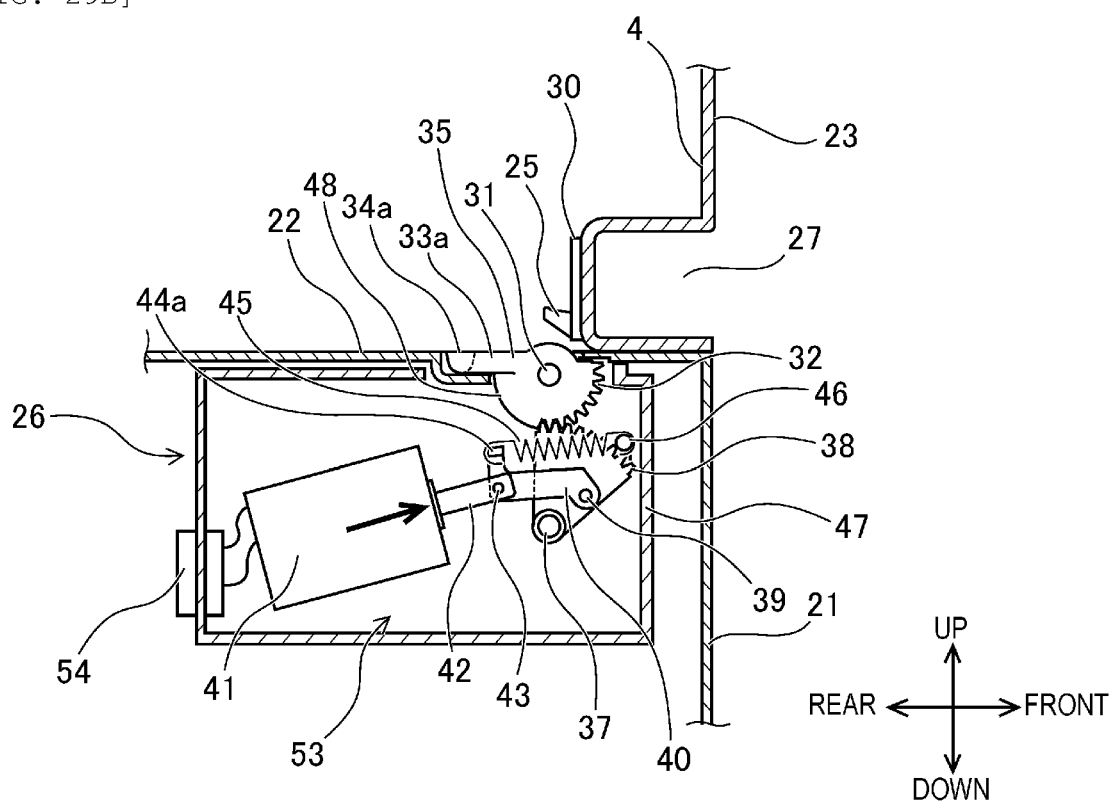

[FIG. 30]
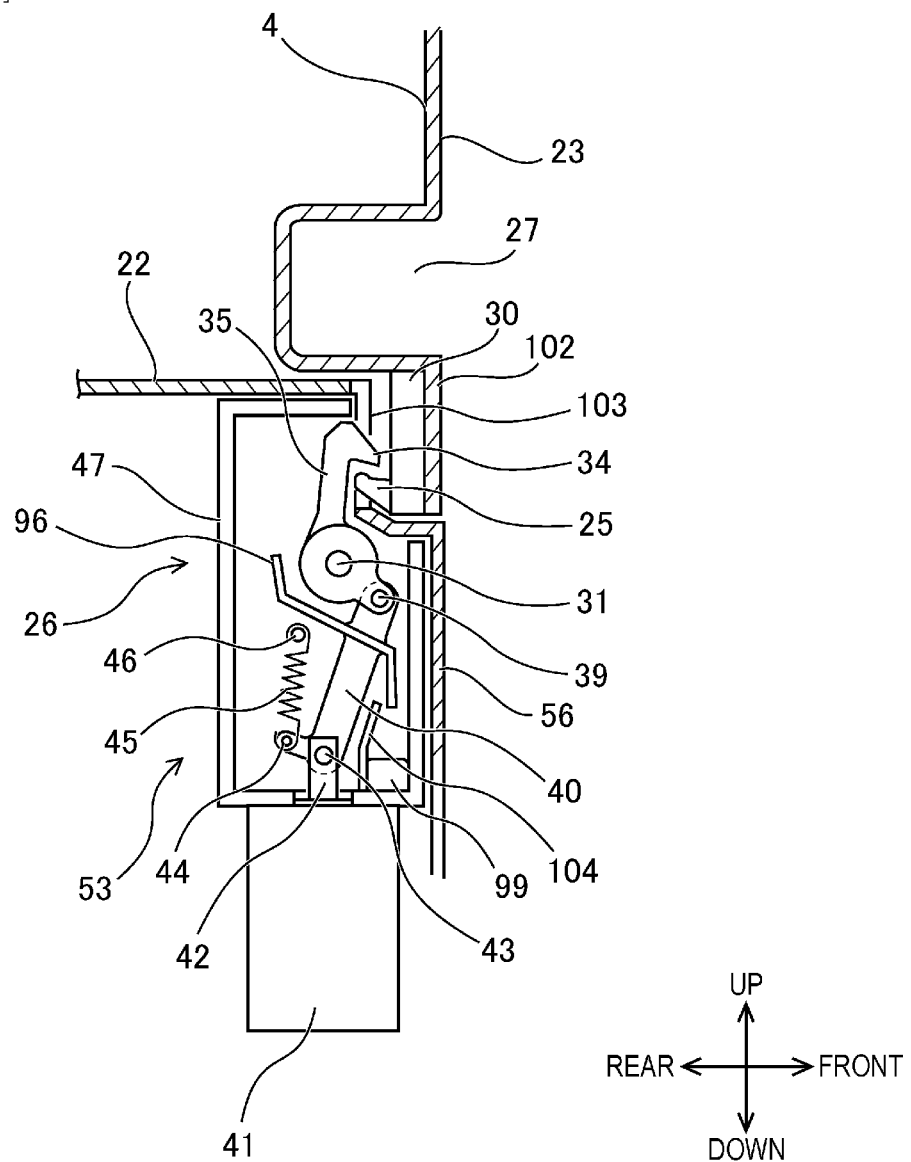

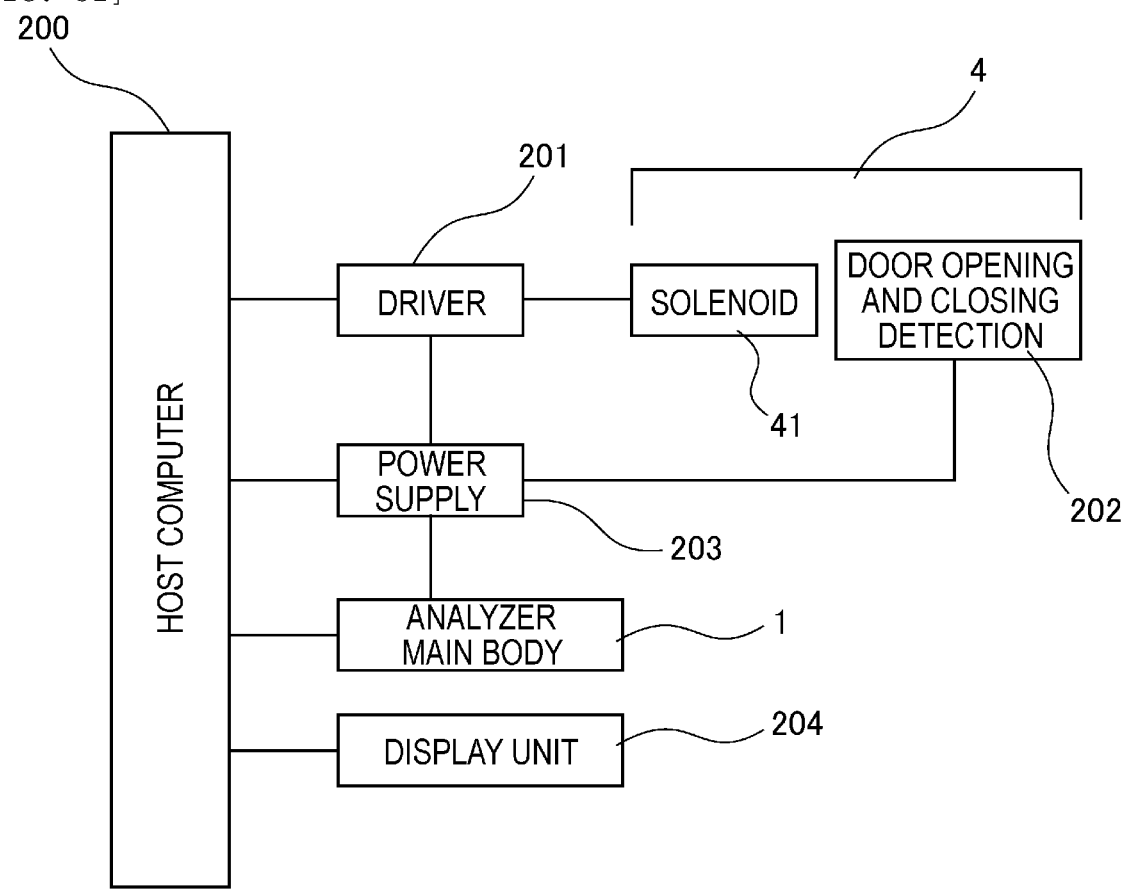
[FIG. 31]

[FIG. 32]
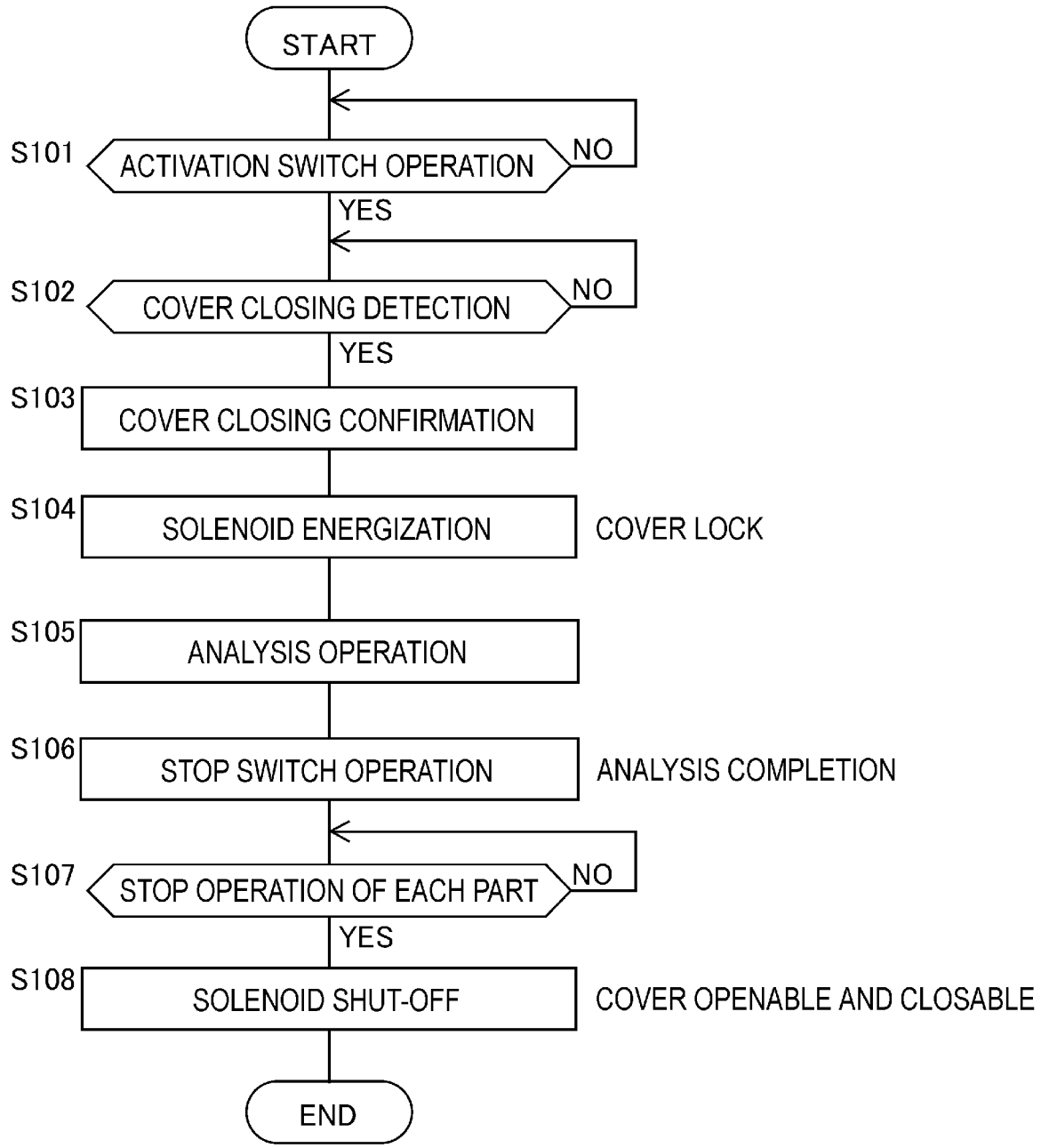

INTERLOCK UNIT AND AUTOMATED ANALYZER EQUIPPED WITH SAME

TECHNICAL FIELD

The present invention relates to an interlock unit and an automated analyzer equipped with the same.

BACKGROUND ART

An automated analyzer is an apparatus that automatically analyzes blood and biological samples and outputs a result and is an apparatus that is essential in a hospital or a medical inspection facility. The automated analyzer is required to perform more diverse inspections in a short time. On the other hand, in an automated analyzer, an openable safety cover including an interlock mechanism (an interlock unit) in an upper portion of a work surface on which analyzing work is performed is provided, and the safety cover is opened during driving of the apparatus to be suspended on a lock, so that an operation of the apparatus is stopped and inspection is not delayed. When an operator performs consumables exchanging work or the like, the operator stops the apparatus and releases lock by the interlock mechanism so that the safety cover can be opened or closed and the operator can perform various kinds of work by accessing the safety cover in the open state to a work surface.

As a technology related to the interlock mechanism, for example, JP-A-2013-076678 (PTL 1) discloses a specimen processing apparatus that processes a specimen and includes a processing apparatus body including operation mechanisms and operating the operation mechanisms to perform an operation of processing a specimen, a cover covering at least one of the operation mechanisms, and a lock mechanism locking the cover to prohibit opening of the cover, and a control unit controlling the lock mechanism. The control unit is configured to be able to set a first mode in which the lock of the cover is not released until an instruction to release the lock is received from a user after the operation of processing a specimen in the operation mechanism ends and a second mode in which the lock of the cover is automatically released after the operation of processing the specimen in the operation mechanism ends.

CITATION LIST

Patent Literature

PTL 1: JP-A-2013-076678

SUMMARY OF INVENTION

Technical Problem

However, in the technology of the related art, maintenance of the lock mechanism is not taken into consideration. For example, when the lock mechanism is broken down, the cover is locked, and thus it is necessary to perform repairing or the like of the lock mechanism in a state in which opening of the cover is prohibited, it is expected that access to the lock mechanism is not easy and it is difficult to repair the lock mechanism.

The present invention has been devised in view of the foregoing circumstances and an objective of the present invention is to provide an interlock unit capable of improving maintenability by facilitating access to the interlock unit and an automated analyzer using the interlock unit.

Solution to Problem

The present specification includes a plurality of means for solving the foregoing problems. For example, an interlock unit is capable of preventing rotation from a closed position to an open position of a cover that is provided so as to cover an upper part of a work surface, which is an upper surface of a casing, and is pivotally supported to be rotatable in a vertical direction between the closed position and the open direction around a support shaft provided on one side of the casing. The interlock unit includes: a hollow case having a rectangular parallelepiped shape disposed at a position adjacent to an inner side surface of the casing, below an end part opposite to the support shaft at the closed position of the cover; an action member that is provided on an upper surface of the case, supported to be movable between a non-operating position and an operating position, and engaged with a protruding part provided on the cover at the operating position to inhibit the cover from rotating toward the open position; electromagnetic drive means provided below the action member to drive the action member; and drive connecting means for driving the action member by connecting the action member and the electromagnetic drive means and transmitting an operation of the electromagnetic drive means to the action member.

Advantageous Effects of Invention

It is possible to improve maintenability by facilitating access to the interlock unit.

The other configurations and advantageous effects are apparent from description of the following embodiments.

BRIEF DESCRIPTION OF DRAWINGS

FIG. 1 is a plan view illustrating an overall configuration of an automated analyzer including a reagent disk.

FIG. 2 is a perspective view of a state in which a safety cover of the automated analyzer is opened.

FIG. 3 is a left side view of the state in which the safety cover of the automated analyzer is opened.

FIG. 4 is a perspective view illustrating a state in which an interlock unit is mounted on a frame.

FIG. 5A is a top view illustrating an unlocked state of an interlock unit according to a first embodiment.

FIG. 5B is a cross sectional view taken along the line A-A in FIG. 5A.

FIG. 6 is a perspective view illustrating the unlocked state of the interlock unit.

FIG. 7 is a perspective view illustrating the unlocked state of the interlock unit.

FIG. 8 is a cross sectional view taken along the line A-A illustrating a locked state of the interlock unit in FIG. 5A.

FIG. 9 is a perspective view illustrating a locked state of the interlock unit.

FIG. 10 is a cross sectional view taken along the line B-B in FIG. 8.

FIG. 11 is a cross sectional view taken along the line C-C in FIG. 8.

FIG. 12 is an exploded perspective view illustrating a structure of the interlock unit.

FIG. 13 is a side view illustrating the locked state of the interlock unit.

FIG. 14 is a rear view of the locked state of the interlock unit.

FIG. 15 is a cross sectional view taken along the line A-A illustrating the locked state of the interlock unit in FIG. 5A, and is a partially enlarged view near a lock claw part.

FIG. 16 is a cross sectional view taken along the line A-A illustrating the locked state of the interlock unit in FIG. 5A, and is a partially enlarged view near the lock claw part.

FIG. 17A is a rear view of the interlock unit, and is an explanatory view illustrating a reaction force at the time of locking in an L-type shape.

FIG. 17B is a rear view of the interlock unit, and is an explanatory view illustrating a reaction force at the time of locking in a T-type shape.

FIG. 18A is a rear view of the interlock unit, and is an explanatory view illustrating a dimensional relationship between a lock lever and lock receiving means.

FIG. 18B is a rear view of the interlock unit, and is an explanatory view illustrating a dimensional relationship between the lock lever and the lock receiving means.

FIG. 19 is a cross sectional view taken along the line A-A of the interlock unit in FIG. 5A, and is a view illustrating a drain path of a liquid that enters into a case.

FIG. 20 is a cross sectional view taken along the line A-A in the locked state of the interlock unit in FIG. 5A, and is a partially enlarged view near a lock lever part.

FIG. 21 is a cross sectional view illustrating an operation when releasing an abnormal lock state of the interlock unit.

FIG. 22 is a perspective view illustrating a configuration of liquid guide means according to a second embodiment.

FIG. 23 is a cross sectional view taken along the line A-A in FIG. 5A in an unlocked state of an interlock unit according to a third embodiment.

FIG. 24 is a perspective view illustrating an unlocked state of the interlock unit.

FIG. 25 is a cross sectional view taken along the line A-A of a locked state of the interlock unit.

FIG. 26 is a perspective view illustrating the locked state of the interlock unit.

FIG. 27A is a top view of an interlock unit according to a fourth embodiment.

FIG. 27B is a cross sectional view taken along the line A-A in FIG. 5A of the interlock unit according to the fourth embodiment.

FIG. 28 is a perspective view of an interlock unit according to a fifth embodiment.

FIG. 29A is a top view illustrating an unlocked state of an interlock unit according to a modification of the fifth embodiment.

FIG. 29B is a cross sectional view taken along the line D-D in FIG. 29A.

FIG. 30 is a cross sectional view of an interlock unit according to a sixth embodiment.

FIG. 31 is a block diagram illustrating a schematic configuration of the automated analyzer.

FIG. 32 is a flowchart illustrating an operation of the interlock unit.

DESCRIPTION OF EMBODIMENTS

Hereinafter, embodiments of the present invention will be described with reference to the drawings.

First Embodiment

A first embodiment of the present invention will be described in detail with reference to FIGS. 1 to 21.

(1) Automated Analyzer 1

FIG. 1 is a plan view illustrating an overall configuration of an automated analyzer including a reagent disk. FIG. 2 is a perspective view of a state in which a safety cover of the automated analyzer is opened and FIG. 3 is a left side view. In the following description, an upward direction and a downward direction in a state in which an automated analyzer 1 is provided are respectively defined as an upper side (up) and a lower side (down), a side and its reverse side on which the operator of the automated analyzer 1 makes access are respectively defined as a front side (front) and a rear side (rear), and a rightward direction and leftward direction when the automated analyzer 1 is viewed from the front side are respectively defined as the right side (right) and left side (left).

As illustrated in FIGS. 1 and 2, the automated analyzer 1 includes a reagent disk (a reagent container holder) 2, a safety cover 4, sample conveying means 5, sample dispensing means 6, a chip rack 7, conveying means 8, an incubator 9, a sample dispensing chip buffer 11, a disposal hole 12, stirring means 13, a reagent dispensing probe 15, stirring means 16, washing means 17, a reaction solution dispensing probe 18, detection unit 19, a casing 21, a work surface 22, and a reagent cooling box (a reagent box) 24.

The casing 21 has a rectangular parallelepiped shape in which a casing frame 55 with high rigidity combined with a steel plate by, for example, means such as welding or rivet fastening is covered around by a front plate 56, right and left side plates 57, a rear plate 58, and an upper surface, that is, the work surface 22 and contains the sample conveying means 5, the washing means 17, the reagent cooling box 24, and, a substrate, a flow passage and the like (of which none is illustrated). The front plate 56, the right and left side plates 57, and the rear plate 58 are detachable in maintenance work.

The safety cover 4 is supported by one side of the upper surface of the casing 21 by, for example, a hinge or the like and to be openable about the hinge. A one-dot chain line in FIGS. 1 and 2 indicates a closed state of the safety cover 4. The safety cover 4 includes an interlock that has, for example, a solenoid or the like as a driving source. During an operation of the automated analyzer 1, the safety cover 4 remains in the closed state via a deadlock when the solenoid is energized. During the stop of the automated analyzer 1, the energization of the solenoid is released and the safety cover 4 can be opened.

The interlock is provided in substantially the center of the right and left of the safety cover front side 24 which is a lower side of a front surface 23 of the safety cover 4 and includes lock receiving means 25 which is a protruding part projected backward from the front surface 23 of the safety cover 4, that is, toward the inside of the automated analyzer and lock means 26 (hereinafter referred to as an interlock unit in some cases) which is provided at a position facing the lock receiving means 25 and works on the lock receiving means 25 when the safety cover 4 in the work surface 22 is closed.

The interlock unit 26 is mounted on the casing frame 55 via a mounting bracket 59. The details of a configuration of the interlock unit 26 will be described later.

A door opening and closing detection 202 is connected to a power supply (not illustrated). When the safety cover 4 is closed, the power supply is connected so that the automated analyzer 1 can be driven. When the safety cover 4 is opened, the power supply is disconnected to stop the automated analyzer 1.

The sample conveying means 5 is configured by, for example, a belt conveyer, a rack handler, or the like and moves a sample 5a inside the automated analyzer 1 to convey the sample 5a up to a movable area of the sample dispensing means 6.

The chip rack 7 is detachably mounted on the automated analyzer 1 and is disposed on the upper surface of the automated analyzer 1 by an operator in a state in which a plurality of sample dispensing chips 10 and a plurality of reaction containers 14 are put.

The conveying means 8 can move in a planar direction and the Z axis direction and can move the chip rack 7, apart of the incubator 9, the sample dispensing chip buffer 11, the disposal hole 12, and the upper side of the stirring means 13. For example, a triaxial robot or the like can be used as the conveying means 8. The conveying means 8 grips the reaction containers 14 one by one from the chip rack 7 and moves the reaction containers 14 to the incubator 9. The conveying means 8 grips the sample dispensing chips 10 one by one from the chip rack 7 and moves the sample dispensing chips 10 to the sample dispensing chip buffer 11.

The sample dispensing chip buffer 11 is a buffer that temporarily puts the sample dispensing chip 10 gripped by the conveying means 8. The sample dispensing chip buffer 11 can put the plurality of sample dispensing chips 10.

The incubator 9 has a substantial disc shape and is rotatable. The incubator 9 holds the plurality of reaction containers 14 in a circumferential direction and can move each reaction container 14 up to a predetermined position with rotation of the incubator 9.

The sample dispensing means 6 is moved above the sample dispensing chip buffer 11, grips any one of the sample dispensing chips 10, moves above the sample 5a, and sucks the sample 5a inside the sample dispensing chip 10. Thereafter, the sample dispensing means 6 moves above the reaction container 14 above the incubator 9 and ejects the sample 5a from the inside of the sample dispensing chip 10 to the inside of the reaction container 14. Thereafter, the sample dispensing means 6 moves above the disposal hole 12 and drops the sample dispensing chip 10 to the inside of the disposal hole 12.

The reagent cooling box 24 has a substantial cylindrical shape and contains the reagent disk 2. A reagent bottle loading port 20 for mounting and detaching the reagent container 3 on and from the reagent disk 2 is provided on the upper surface of the reagent cooling box 24. In the reagent bottle loading port 20, an openable reagent bottle loading port lid (not illustrated) is provided. The reagent cooling box 24 has a heat insulating function to control the reagent container 3 at a given temperature.

The reagent disk 2 forms a slot to hold the plurality of reagent containers 3 radially in the circumferential direction. The reagent disk 2 is rotatable about a central axis extending in a vertical axis direction. With rotation of the reagent disk 2, each reagent container 3 is moved to a predetermined position. For example, with rotation of the reagent disk 2, the reagent container 3 that contains a target reagent can be moved to a reagent dispensing position 15a. The reagent container 3 may contain magnetic particles for stirring the reagent.

The reagent dispensing probe 15 can be moved in front, rear, right, and left directions (horizontal direction) by, for example, an actuator or the like. The reagent dispensing probe 15 sucks a predetermined amount of reagent using a reagent dispensing pipette (not illustrated) from the reagent container 3 located at the reagent dispensing position 15a and dispenses the reagent to the reaction container 14 held in the incubator 9.

The stirring means 16 includes a magnetic particle stirring arm that is provided above the reagent dispensing position 15a and can be rotated about a central axis extending the vertical axis direction. For example, magnetic particle stirring means with a paddle shape or a spiral shape is provided at a lower end of the magnetic particle stirring arm. The magnetic particle stirring arm stirs the reagent by lowering the magnetic particle stirring means into the reagent including magnetic particles and rotating the reagent. To prevent precipitation of the magnetic particles in the reagent, the magnetic particle stirring arm stirs the reagent immediately before the reagent is disposed by the reagent dispensing probe 15. After the stirring, the magnetic particle stirring arm is moved to the washing means 17 in which a washing liquid is entered and rotates the magnetic particle stirring means for washing.

The reaction container 14 in which a predetermined reagent and the sample 5a are dispensed is managed at a predetermined temperature by the incubator 9 and reaction is accelerated for a predetermined time. The reagent and a reaction solution of the sample 5a are supplied from the reaction container 14 to the detection unit 19 by the reaction solution dispensing probe 18, so that physical properties are detected by the detection unit 19. Examples of the physical properties include an amount of luminescence, an amount of scattered light, an amount of transmitted light, a current value, and a voltage value, but the present invention is not limited thereto. The detection unit 19 may perform analyzing while remaining the reaction solution is maintained inside the reaction container 14.

The reaction container 14 that contains the reaction solution of which the analyzing of the detection unit 19 ends is moved to above the disposal hole 12 by the conveying means 8 to be disposed inside the disposal hole 12. According to a kind of measurement, one reaction container 14 may be used for measurement a plurality of times. In this case, the reaction solution inside the reaction container 14 after the analyzing ends is disposed, and then the reaction container 14 is washed.

A host computer 200 is connected to the automated analyzer 1. A series of operations in the foregoing configuration of the automated analyzer 1 is controlled by the host computer 200. The automated analyzer 1 can efficiently analyze a plurality of samples with regard to a plurality of analysis items by combining or repeating the foregoing operations.

(2) Interlock Mechanism

In FIG. 3, a closed state of the safety cover 4 is indicated by a solid line and an open state of the safety cover 4 is indicated by a one-dot chain line. A handle 27 which is a recessed part into which a finger is inserted when the safety cover 4 is opened from the closed position is provided on the front side of the safety cover 4. In the embodiment, the lock receiving means 25 that comes into contact with the rear surface of the handle 27 and extends backward is provided.

The safety cover 4 is pivotally supported to be rotatable between a fully open position and a closed position around a cover support shaft 28 provided along the vicinity of the rear side of the body. When the safety cover 4 is opened to come into contact with a stopper (not illustrated) and is supported not to be closed by its weight by support means (not illustrated), the front side of the safety cover 4 is raised up to a front side height H1. A worker can insert his or her arm or upper half of the body from a gap between the work surface 22 and the front side of the safety cover 4 and perform cleaning or exchanging of various operating mechanism groups 29 provided on the work surface 22 or perform cleaning of the work surface 22 or exchanging of a reagent bottle 3. Accordingly, the front side height H1 of the safety cover 4 is preferably sufficient in height. There is preferably no partial protrusion or the like below the front side of the safety cover 4 or a smooth external shape is preferably formed although there is a protrusion.

It is effective that the handle 27 and the lock receiving means 25 are provided close to a substantial middle of the safety cover 4 in the right and left directions. In particular, it is particularly preferable to provide the lock receiving means 25 on the rear surface of the handle 27. That is, when the operator attempts to open the safety cover 4 in a locked state and the lock receiving means 25 is provided near the handle 27 or on the rear surface of the handle 27, the safety cover 4 is locked despite being slightly opened. Conversely, when the lock receiving means 25 is located at a position deviated to one of the right and left from the handle 27, a moment is produced by a force of a hand attempting to open the safety cover 4 and a reaction force from the lock receiving means 25 attempting the locking. Therefore, the safety cover 4 floats toward the handle 27 while being twisted, and thus there is a problem that a floating amount toward the safety cover 4 close to the handle 27 increases.

(3) Overview of Mounting of Interlock Unit 26 on Frame 55

FIG. 4 is a perspective view illustrating a state in which an interlock unit is mounted on a frame.

The interlock unit 26 includes a case 47 that has a rectangular parallelepiped shape and is formed of a resin, a lock lever 35 which is an action member provided on the upper surface of the case, and a solenoid 41 which is drive means provided on the lower surface of the case 47, and includes a drive connecting member that connects a plunger of the solenoid 41 and the lock lever 35 inside the case to operate. The details will be described later.

As described above, the front plate 56 that forms a front surface of the casing 21 is provided to be detachable in maintenance work such as period inspection. FIG. 4 illustrates the front plate 56 that is a detached state and the front surface of the casing 21 is opened as a front surface opening. The interlock unit 26 is provided close immediately backward the front plate 56 and is screwed and fixed with mounting screws 61 via screw holes 105 to the casing frame 55 included in the casing 21 via the mounting bracket 59 from the front. The interlock unit 26 is mounted from the lower side of the work surface 22 via a work surface opening 22a provided on the work surface 22, and the upper surface is exposed from the work surface 22 and is positioned and fixed to be substantially flush with the work surface 22. The mounting bracket 59 has, for example, a substantial U shape bilaterally symmetric in a top plan view, a mounting groove 60, which is a vertically long slit, whose upper end is opened in the middle of the right and left and whose lower end is continuous in the right and left direction in a front view is provided, and right and left sides of the mounting groove 60 facing the front serve as a unit mounting surface 93. A right and left width of the mounting groove 60 is greater than a case width of the interlock unit 26. The interlock unit 26 is disposed inside the mounting groove 60 and can be screwed by the mounting screws 61 from the front. A height of the mounting screw 61 is below the work surface 22. When the front plate 56 of the casing 21 is detached, the interlock unit 26 is disposed at a position at which the interlock unit 26 can be directly viewed from the front via the front surface opening. Therefore, it is easy to detach and mount the mounting screws 61 with a driver, and thus maintenability is good. Accordingly, the mounting and detaching are easy, and assemblability and maintenability are good.

Further, as illustrated in FIG. 3, the interlock unit 26 is long vertically and short in the front and rear. Therefore, when the front plate 56 is detached and the mounting screws 61 are detached with a driver 62 from the front even in the closed state of the safety cover 4, the interlock unit 26 is easily detached downward to the front via the front surface opening. Therefore, even in a state in which the safety cover 4 is not opened in a lock state due to breakdown or the like, it is easy to detach the interlock unit 26. Therefore, maintenability is good. Appropriate disposition of the interlock unit 26, the mounting bracket 59, and the frame will be described later.

(4) Handle 27 and Lock Receiving Means 25

The handle 27 which is a recessed part into which a finger is inserted along the lower end is provided on the front surface of the safety cover 4 and a pair of right and left lock receiving means 25 is close to the rear surface of the handle 27 and protrude to the rear via a plate-shaped lock receiving base 30. A surface oriented to the lower side of the pair of lock receiving means 25 is formed as a slope surface tapered so that the distal end of the lock receiving means 25 becomes thin in a side view, the left and right ends of the pair of lock receiving means 25 are formed as slope surfaces tapered so that the distal end of the lock receiving means 25 becomes thin in a plan view, and the ridges of the side surfaces of the lock receiving means 25 are smoothly formed at an obtuse angle. The upper surface of the lock receiving means 25 is formed as a slope surface of which a height increases away from the front surface of the safety cover 4, and an angle θ1 between the upper surface of the lock receiving means 25 and a vertical surface is an acute angle less than 90 degrees. When the lock receiving means 25 is molded of, for example, a POM (polyacetal) resin, the smooth shape can be easily generated, which is therefore appropriate.

(5) Case 47

The case 47 of the interlock unit 26 is formed in a substantially rectangular parallelepiped shape and includes a left side case 47a, a right side case 47b, and an upper surface case 47c. The left side case 47a and the right side case 47b are a pair of right and left cases and have a substantially external shape which is bilaterally symmetric and have a shape in which widths in the right and left directions are less than lengths in the front and rear directions and heights in the up and down directions are largest in the embodiment. A plunger 42 of the solenoid 41 which is a drive source (an actuator) is upward fixed to the lower surface of the case 47. A connecting plate 40, a first gear 32, a second gear 38, a pull spring 45, and the plunger 42 serving as drive connecting means 53 are disposed inside the case 47. The left side case 47a, the right side case 47b, and the upper surface case 47c are integrally molded of, for example, an ABS resin, and thus can be realized in a complicated shape at low cost, which is therefore appropriate.

(6) Positional Relation Among Lock Lever 35, Drive Connecting Means 53, and Solenoid 41

Here, since the lock lever 35 which is an action member is provided on the upper surface of the case 47, the solenoid 41 which is an actuator is provided downward close to the lower surface of the case 47, the drive connecting means 53 transmitting a drive force is provided between the action member and the actuator, and the actuators, the action member and the drive connecting means 53 are disposed vertically in a row, a projection area can be small when viewed from the upper side. Thus, since a configuration appropriate for the miniaturization of the casing 21 can be realized and dimensions in the front and rear directions can be set to be small, the interlock unit 26 can be disposed along the front plate 56 to the rear near the front plate 56 of the casing 21.

(7) First Gear 32 and Lock Lever 35

A first support shaft 31 is molded of, for example, an ABS (acrylonitrile butadiene styrene) resin to be integrated with the left side case 47a and is provided to extend toward the right side case 47b in parallel to the safety cover front surface 23. A distal end of the first support shaft 31 is fitted in a first support bearing part 63 which is a recessed part provided in the right side case 47b. The first support shaft 31 may be molded of the ABS resin like the right side case 47b and the left side case 47a. The first gear 32 is pivotally supported to be rotatable around the first support shaft 31 via a first gear shaft hole 90. The teeth of the first gear 32 are provided within a range of about 90 degrees around the first gear shaft hole 90. A supporting part 33 which is molded integrally with the first gear 32 and extends backward and the distal end of the supporting part 33 form a pair of lock parts 34 projected in the right and left directions in parallel to the first support shaft 31 with the supporting part 33 interposed therebetween, and the pair of lock parts 34 and the supporting part 33 form the lock lever 35 in a substantial T-type shape. The lock lever 35 is molded of, for example, a POM resin. In the lock part 34, an upper surface is formed in a tapered shape which is thin downward on a plane in a side view when viewed in the right and left directions at the time of lock releasing, and a lower side is a cross-sectional surface with a smooth substantially half cylindrical shape. Further, the pair of lock parts 34 has a rectangular shape extending in the right and left directions in which R is provided in each corner when viewed from the upper surface, and the lower half has a smooth hemispheric shape. Connection portions of the supporting part 33 and the pair of lock parts 34 are smoothly connected in an R shape, and thus inhibit damage due to stress concentration. That is, the lock lever 35 is an example of an action member that acts to lock the safety cover 4 with respect to the lock receiving means 25.

(8) Another Example of Shape of Lock Lever 35

In the lock lever 35, projection amounts of the pair of lock parts 34 to the supporting part 33 in the right and left directions may not be the same, or an asymmetric shape in which one of the lock parts is long and the other is short may be realized. Alternatively, the lock parts 34 may be formed in a substantial L shape in a plan view in which only one of the lock parts 34 extends toward the supporting part 33.

(9) Cylindrical Part 48

A cylindrical part 48 that has no teeth equal to the tooth tip circle of the first gear 32 is formed from the tooth tip of the lower surface side of the first gear 32 to the supporting part 33.

(10) Positional Relation Between Work Surface 22 and Lock Lever 35

The lock lever 35 is disposed in the front and rear directions in parallel to the work surface 22 at the time of releasing of the lock. The upper surface of the upper surface case 47c is provided on substantially the same surface as the work surface 22 and a recessed part for accommodating the lock lever 35 at the time of releasing the lock is provided. That is, a right and left width of the upper surface case 47c is greater than the width of the recessed part for accommodating the lock lever 35. The upper surface of the lock lever 35 is planar and is the same surface as the upper surface of the upper surface case 47c. A pair of partially cylindrical cover parts 36 which are gentle protrusions covering the first support shaft 31 may be provided on the upper surface of the upper surface case 47c with the lock lever 35 interposed therebetween.

(11) Positional Relation Between Cover Parts 36 and Lock Lever 35

In the unlocked state, a part sandwiched between the pair of right and left cover parts 36 on the upper surface of the lock lover 35 may be formed in a partial cylindrical shape like the cover parts 36 so that the cover parts 36 and the lock lever 35 are smoothly continuous. Since there is no step or protrusion, for example, a cleaning tool such as a cloth or a brush is not caught even when a user cleans the work surface 22.

(12) Lock Part 34

An internal gap between the pair of lock receiving means 25 in the right and left directions is greater than a width of the supporting part 33 in the right and left directions. The supporting part 33 can be entered between the pair of lock parts 34. The whole width of the pair of lock parts 34 in the right and left directions is greater than the width of the distal end of the pair of lock receiving means 25 in the right and left directions. The left lock part 34 can engage with the left lock receiving means 25 and the right lock part 34 can engage with the right lock receiving means 25.

(13) Second Gear 38

A second support shaft 37 is provided to be integrated with the left side case 47a and extend toward the right side case 47b in parallel to the first support shaft 31. The distal end of the second support shaft 37 is fit in a second support bearing part 64 which is a recessed part provided in the right side case 47b. The second gear 38 is molded of, for example, a POM resin and is pivotally supported to be rotatable around the second support shaft 37 and engages with the first gear 32 to rotate. The dimensions of the second gear 38 are in a range in which the first gear 32 is rotated at 90 degrees or 90 degrees or more so that the lock lever 35 rises.

(14) Solenoid 41

A connecting shaft 39 is provided in the second gear 38 in parallel to the second support shaft 37 and one end of the connecting plate 40 is pivotally supported in the connecting shaft 39 to be rotatable. The other end of the connecting plate 40 is pivotally supported in a drive pin 43 provided at one end of the cylindrical plunger 42 of the solenoid 41 which is an electrical actuator. The plunger 42 is supported to be movable in a longitudinal direction to the solenoid 41. When the solenoid 41 is energized from a power supply apparatus (not illustrated), the plunger 42 is sucked to be close to the solenoid 41. When the energization is released, a suction force is released. In the embodiment, the plunger 42 can be moved in the up and down directions and a hole formed through the drive pin 43 is provided near the upper end of the plunger 42 in the right and left directions.

A first spring hook 44 is provided at one end of the second gear 38 and one end of the pull spring 45 is hung. The other end of the pull spring 45 is hung on a second spring hook 46 provided integrally with the left side case 47a and a spring force by the pull spring 45 is urged in a direction in which the plunger 42 is taken out from the solenoid 41 via the second gear 38 and works as a return spring when the energization to the solenoid 41 is released.

(15) Drive Connecting Means 53

The plunger 42, the connecting plate 40, the first gear 32, the second gear 38, and the pull spring 45 configure the drive connecting means 53 for driving a drive force between the solenoid 41 and the lock lever 35 when the lock lever 35 is driven.

(16) Case 47 (Left Side Case 47a and Right Side Case 47b)

A solenoid mounting part 66 is provided integrally with the left side case 47a and is disposed so that a mounting surface of the solenoid 41 is oriented backward and a housing of the solenoid 41 is screwed by mounting screws 107 from the front. The plunger 42 is disposed upward. A pair of thin sheet-shaped mounting seats 67, 67 extending in the up and down directions is provided to be substantially symmetric to the right of the left side case 47a and the left of the right side case 47b, and the interlock unit 26 can be screwed to the mounting bracket 59 provided in the casing frame 55 of the casing 21 via the mounting seats 67, 67 from the front. The mounting seats 67, 67 are provided at substantially at the same positions as the first support shaft 31 in the front and rear directions in a side view from the right and left or in the slight front of the first support shaft 31, that is, near immediately below the lock receiving means 25 provided in the safety cover 4. The mounting seats 67, 67 have rigidity guaranteed by a reinforcing rib 68.

(17) Width and Shaft Stress of Case 47

When a load is applied to the first support shaft 31, the second support shaft 37, and the first spring hook 44 supporting the first gear 32, the second gear 38, and the pull spring 45, a maximum bending stress occurs in a root part. To reduce the bending stress, it is effective to enlarge a shaft diameter and shorten the length of the shaft. Here, the first support shaft 31, the second support shaft 37, and the first spring hook 44 are molded of a resin to be integrated with the left side case 47a. Therefore, to shorten the lengths of the shafts, it is appropriate to narrow an interval between a side wall part 65a of the left side case 47a and a side wall part 65b of the right side case 47b, that is, the width of the case 47. That is, by narrowing the widths of the left side case 47a and the right side case 47b further than the width of the upper surface case 47c or narrowing the widths of the left side case 47a and the right side case 47b than the width of the lock lever 35 or the width of the solenoid 41, it is possible to reduce stress and obtain the interlock unit 26 with high reliability.

That is, widths near the upper surfaces of the left side case 47a and the right side case 47b facing the upper surface case 47c are expanded to serve as upper surface case mounting parts 69 and a step 70a is provided between the side wall parts 65a and 65b. A step 70b is provided between the solenoid mounting part 66 and the side wall parts 65a and 65b.

(18) Snap Fit Claw 73

In the right side case 47b, so-called snap fit claws 71 fitted in the left side case 47a are provided on, for example, two locations, the front surface and the rear surface. In the left side case 47a, a receiving part 72 corresponding to the snap fit claw 71 is provided. In the upper surface case 47c, snap fit claws 73 fitted in the right side case 47b and the left side case 47a are provided in two locations to the right and left, and receiving parts 74 corresponding to the snap fit claws 73 of the right side case 47b and the left side case 47a are provided for fixing snap fitting.

(19) Another Example of Combination of Left Side Case 47a and Right Side Case 47b Female screws (not illustrated) may be provided in the left side case 47a and screw holes may be provided at corresponding positions of the right side case 47b to fasten the right side case 47b and the left side case 47a using one screw or a plurality of screws.

(20) Upper Surface Case 47c and Upper Surface Cover 76

In the upper surface case 47c, a through hole 75 passing the lock part 34 overhung to the right and left of the lock lever 35 at the time of assembly is provided between the first support shaft 31 and the front surface of the upper surface case 47c. A upper surface cover 76 can cover the through hole 75 from the upper side and is fixed to the upper surface case 47c by snap fit claws 77 from the inner side. The front end of the upper surface case 47c is located to the front of the front edge of the through hole 75 and the rear end of the upper surface case 47c is located on the rear side of the rear edge of a recessed part 49 in which the lock lever 35 is accommodated to form a substantially rectangular shape in a plan view. The outer circumferences of upper surface covers 76 extend downward and cover the upper surface case mounting parts 69 provided near the upper ends of the left side case 47a and the right side case 47b from the outside on the cross sectional surfaces in the right and left directions, and thus the upper surface case mounting parts 69 of the left side case 47a and the right side case 47b function as a case opening prevention part 91 that prevents spread deformation in the right and left directions.

(21) Rib Around Case 47d

The upper surface of the upper surface case 47c passes from the lower side of the work surface opening 22a opened to the work surface 22 and is mounted to become substantially the same surface with the work surface opening 22a. A rib around case 47d which is a rib projected in the circumference of the upper surface case 47c in a plan view is provided slightly below the upper surface of the upper surface case 47c. The rib around case 47d on which the interlock unit 26 is mounted is located slightly below the work surface 22. The outer circumference of the rib around case 47d has dimensions greater than the work surface opening 22a and covers a gap occurring between the upper surface case 47c and the work surface opening 22a in a plan view when the interlock unit 26 is mounted so that a liquid or foreign matters can be prevented.

(22) Connecting Plate 40

The connecting plate 40 has a substantial H shape which is bilaterally symmetric when viewed from the front and is molded of, for example, a POM resin. A drive pin hole 78 is punched at one end on the lower side in the right and left directions and a connecting shaft hole 79 is punched at the other end on the upper side in parallel to the drive pin hole 78.

The drive pin hole 78 at the one end has a gap with a width slightly greater than the diameter of the plunger 42. The plunger 42 is inserted into the gap and the drive pin 43 is penetrated so that the connecting plate 40 is pivotally supported at the plunger 42. The connecting shaft hole 79 at the other end is fitted to be rotatable in the connecting shaft 39 which is a projection provided in the second gear 38 by so-called snap fitting. To facilitate the insertion of the snap fitting in the connecting shaft 39, a slope 80 opened outward from the connecting shaft hole 79 may be formed. Alternatively, a slope facing the slope 80 may be formed at the distal end of the connecting shaft 39.

(23) Second Gear 38 and Waterproof Rib 82

The second gear 38 fits a second gear shaft hole 81 in the second support shaft 37 to be pivotally supported to be rotatable. In the inner circumference of the gear teeth provided partially in the outer circumference of the second gear 38, a thin cylindrical waterproof rib 82 greater than the width of teeth in the right and left directions is provided to be concentrically integrated with the second gear 38 and extends close to the inner wall surfaces of the left side case 47a and the right side case 47b. The rear end of the waterproof rib 82 has a shape extending downward so that a liquid dropping to the upper surface of the waterproof rib 82 can flow. The rear end of the waterproof rib 82 is located on the rear side of the connecting plate 40 and the plunge 42 of the solenoid 41 to serve as a first waterproof rib end 83. The front end of the waterproof rib 82 opposite to the first waterproof rib end 83 serves as a second waterproof rib end 84.

(24) Labyrinth Structure (Case 47)

On inner wall surfaces of the left side case 47a and the right side case 47b, a first case rib 85 and a second case rib 86 that have partially arc shape concentric with the waterproof rib 82 and are projected inward are provided. The inner circumference of the first case rib 85 is greater than the outer circumference of the waterproof rib 82 of the second gear 38 and is disposed with a gap of, for example, about 1 mm. The outer circumference of the second case rib 86 is less than the inner circumference of the waterproof rib 82 of the second gear 38 and is disposed with a gap of, for example, about 1 mm. The first case rib 85 and the second case rib 86 are provided within a range in which the ribs do not come into contact with the second gear 38, and the distal ends of the first case rib 85 and the second case rib 86 are disposed with a gap of, for example, about 1 mm with the right and left side surfaces of the second gear 38. That is, the right and left side surfaces of the second gear 38, the first case rib 85, the second case rib 86, and the waterproof rib 82 are formed in a so-called labyrinth structure that has a complicated cross-sectional shape. The first case rib 85, the second case rib 86, and the waterproof rib 82 are concentric. Therefore, when the second gear 38 is rotated, the labyrinth structure is maintained. With the labyrinth structure, a liquid is inhibited from passing between the first case rib 85 or the second case rib 86 and the waterproof rib 82.

(25) Gutter 87 and First Drain Port 88

The rear surface of the second case rib 86 extends downward vertically along the plunger 42 on the rear side of the connecting plate 40 and the plunger 42 of the solenoid 41. The vicinity of the lower end of the second case rib 86 extends seamlessly from the inner wall of the left side case 47a to the inner wall of the right side case 47b and the lower surface serves as a gutter 87 forming a slope surface sloping to be gradually lowered from the inner wall of the right side case 47b to the inner wall of the left side case 47a. A part coming into contact with the gutter 87 of the inner wall of the left side case 47a is opened to serve as a first drain port 88.

(26) Third Case Rib 89 and Second Drain Port 92

A third case rib 89 is provided on the opposite side of the plunger 42 of the solenoid 41 to the gutter 87 and the lower side of the second support shaft 37. The third case rib 89 is erected integrally with the left side case 47a and its lower end comes into contact with the lower surfaces of the left side case 47a and the right side case 47b. The third case rib 89 extends upward vertically from the lower end, is then bent in a direction close to the connecting plate 40, and slopes up to the lower vicinity of the second support shaft 37 to extend up to a third case rib end 106. A second drain port 92 is opened between the front surfaces of the third case rib 89, and the left side case 47a and the right side case 47b on the lower surfaces of the left side case 47a and the right side case 47b.

(27) Molding of Case 47

By forming the left side case 47a, the right side case 47b, and the upper surface case 47c as resin-molded components, the drain ports 88 and 92 and liquid guide means such as the first case rib 85, the second case rib 86, the third case rib 89, and the gutter 87 can be appropriately disposed to be integrated with the case. Therefore, there is the advantageous effect of reducing the number of components and realizing a simple configuration.

(28) Assembly Sequence of Interlock Unit 26

Next, an example of an assembly sequence of the interlock unit 26 will be described.

The drive pin 43 is penetrated into the drive pin hole 78 to connect the connecting plate 40 and the plunger 42 of the solenoid 41. The connecting shaft hole 79 of the connecting plate 40 is fitted in the connecting shaft 39 provided in the second gear 38 by the snap fitting. The solenoid 41 is screwed to the solenoid mounting part 66 provided integrally with the left side case 47a and the second gear shaft hole 81 is threaded to the second support shaft 37. One end of the pull spring 45 is hung in the first spring hook 44 and the other end thereof is hung in the second spring hook 46. The first gear shaft hole 90 of the lock lever 35 is threaded to the first support shaft 31 and the plunger 42 is disposed to locate the lock lover 35 at a releasing position at the time of pulling by a predetermined amount, that is, an operation stroke amount, from the solenoid 41 by a pulling force of the pull spring 45, so that the first gear 32 and the second gear 38 engage with each other, and the right side case 47b and the left side case 47a are snap-fitted or fastened by screws.

FIG. 8 is a cross sectional view taken along the line A-A illustrating a locked state of the interlock unit in FIG. 5A. As illustrated in FIG. 8, since the first support shaft 31, the second support shaft 37, and the distal end of the first spring hook 44 are fitted in the corresponding recessed parts provided in the right side case 47b, the first support shaft 31, the second support shaft 37, and the first spring hook 44 serve as a beam rather than a cantilever. Accordingly, it is possible to reduce stress occurring when an external force is received, and thus it is possible to realize the interlock unit with high reliability.

Next, after the lock part 34 passes to the through hole 75 provided in the upper surface case 47c, the upper surface case 47c is attached from the upper side between the upper surface case mounting parts 69 which are parts with wide widths of the upper surfaces of the left side case 47a and the right side case 47b. The through hole 75 is covered with the upper surface covers 76. The upper surface covers 76 are provided on right and left sides and combined by so-called snap fitting from the inside of the through hole 75 by one pair of snap fit claws 77 projected outside.

Since the first support shaft 31, the second support shaft 37, the first spring hook 44, and the solenoid mounting part 66 are all provided integrally with the left side case 47a, the solenoid 41 and the drive connecting means 53 are mounted and held on the left side case 47a, and then the right side case 47b and the upper surface case 47c can be mounted on the left side case 47a. Therefore, the assembly is easy.

(29) Upper Surface Case 47c

The recessed part 49 with a T-type shape provided on the upper surface case 47c has a shape with a bottom surface 50. Thus, foreign matters or a liquid is prevented from falling inside the case 47 from the recessed part 49.

(30) Operation of Solenoid 41

When the safety cover 4 is locked and power is cut due to abrupt power failure or the like during activation of the automated analyzer, the interlock is released and the safety cover 4 preferably enters an openable state. This is because postprocessing cannot be performed to take out remaining reagents if the safety cover 4 remains closed. This is because it is preferable to use a solenoid as a drive source rather than a motor as a configuration in which the interlock is released when power is cut, and a locked state transitions to a released state by the force of a return spring since a suction force of the solenoid disappears with the power failure as the characteristics. When the drive source is a motor, an operation is not performed at a locked position at which power is cut. Therefore, the safety cover 4 cannot be opened.

(31) Positional Relation Between Lock Lever 35 and Upper Surface Case 47c or Upper Surface Cover 76

When an operator opens the safety cover 4 and handles a liquid such as a reagent liquid, the operator can spill the liquid erroneously to the work surface 22. When a watertight structure is realized so that a spilled liquid cannot be entered into the interlock unit 26, the gap cannot be provided between the lock lever 35 and the upper surface case 47c or the upper surface cover 76. Therefore, for example, it is necessary to fill the gap with a watertight member formed of a rubber. However, with such a configuration, frictional resistance may occur upon pivoting the lock lever 35, which disturbs an operation of the lock lever 35. When a motor is used as the drive source, a speed is decreased by a gear or the like and a torque is increased in driving against the frictional resistance. However, when a solenoid is used, an operation stroke of the solenoid is small. Therefore, the solenoid is generally used without decreasing a speed, and thus it is preferable to reduce a drive load as much as possible. Therefore, the watertight member cannot be used and it is necessary to provide the gap between a pivoting member and a fixed member without disturbing an operation.

That is, since the lock lever 35 and the first gear 32 are integrally rotatable about the first support shaft 31, a gap 108 is provided between the upper surface case 47c or the upper surface cover 76 so that a backlash of about 0.2 mm to 0.5 mm, for example, is generated without disturbing the pivoting. Accordingly, when a liquid such as a reagent liquid is erroneously spilled near the lock lever 35, the liquid can invade into the case from the gap 108. The liquid invading into the case reaches, for example, the upper surface of the waterproof rib 82 via a tooth surface or a side surface of the second gear 38 along a tooth surface or a side surface of the first gear 32. Since the upper surface of the waterproof rib 82 is cylindrical and the right and left side surfaces are configured as the labyrinth structure so that a liquid scarcely flows, as described above, a liquid on the upper surface of the waterproof rib 82 flows toward the first waterproof rib end 83 on the rear side or the second waterproof rib end 84 on the front side along the waterproof rib 82.

(32) Drain Path

FIG. 19 is a cross sectional view taken along the line A-A of the interlock unit in FIG. 5A, and is a view illustrating a drain path of a liquid that enters into the case. As indicated by arrows in FIG. 19, a first liquid guide part is provided in which a liquid flowing to the first waterproof rib end 83 on the rear side on the upper surface of the waterproof rib 82 drops inside the gutter 87 from the first waterproof rib end 83 and drains from a first drain port 88 to the outside of the case. A second liquid guide part is provided in which a liquid flowing to the second waterproof rib end 84 on the front side on the upper surface of the waterproof rib 82 drops between the front surface of the case and the third case rib 89 from the second waterproof rib end 84 and drains from the second drain port 92 to the outside of the case.

(33) Liquid Guide Means

The labyrinth structure including the waterproof rib 82, the waterproof rib 82, the first case rib 85, and the second case rib 86, the gutter 87, and the third case rib 89 described above form liquid guide means. Thus, there is the advantageous effect in which a liquid invading into the case drains from the first drain port 88 or the second drain port 92 to the outside of the case 47 so that the liquid does not flow to the solenoid 41.

(34) Unlocked State

FIG. 5A is a top view illustrating an unlocked state of an interlock unit according to the first embodiment and FIG. 5B is a cross sectional view taken along the line A-A in FIG. 5A. FIG. 6 is a perspective view illustrating the unlocked state of the interlock unit and FIG. 7 is a perspective view. In a state illustrated in FIGS. 5A to 7, energization to the solenoid 41 is released, the second gear 38 is rotated clockwise in FIG. 5B by a spring force of the pull spring 45, and the plunger 42 is in a state in which the plunger 42 is pulled at a maximum from the solenoid 41 via the connecting plate 40. The first gear 32 is rotated counterclockwise in FIG. 5B, and the supporting part 33 and the upper surfaces of the pair of lock parts 34 are accommodated in the recessed part 49 provided on the work surface 22 to be flush with the work surface 22. The recessed part 49 is formed in the T-type shape when viewed from the upper side so that the T-shaped lock lever 35 can be accommodated and is formed to be large with a gap of about 1 mm, for example, from the circumference of the outer shape of the lock lever 35 without interference with the outer circumference of the lock lever 35.

That is, since the lock part 34 does not work on the lock receiving means 25 provided on the safety cover 4 in this state, the user can freely open and close the safety cover 4 in the locked state.

(35) Locked State

FIG. 8 is a cross sectional view taken along the line A-A illustrating a locked state of the interlock unit in FIG. 5A and FIG. 9 is a perspective view illustrating a locked state of the interlock unit. FIG. 10 is a cross sectional view taken along the line B-B in FIG. 8 and FIG. 11 is across sectional view taken along the line C-C in FIG. 8.

A state illustrated in FIGS. 8 to 11 is a locked state of the safety cover 4. In the closed state of the safety cover 4, the solenoid 41 is energized to suck the plunger 42 with a force greater than the spring force of the pull spring 45, move the connecting plate 40 and the connecting shaft 39 via the drive pin 43 in a direction close to the solenoid 41, and rotate the second gear 38 counterclockwise in FIG. 8. Since the first gear 32 engages with the second gear 38, the first gear 32 is rotated clockwise, the supporting part 33 and the lock part 34 rises from the work surface 22, and the safety cover 4 comes into contact with the lock receiving base 30 to stop above the pair of lock receiving means 25 provided on the rear side of the handle 27. When the user hooks his or her finger on the handle 27 to raise and open the front surface of the safety cover 4 in this state, the lock receiving means 25 ascends along with the front surface of the safety cover 4 and the upper surfaces of the pair of right and left lock receiving means 25 come into contact with the lower surfaces of the corresponding right and left lock parts 34 to stop the opening of the safety cover 4. That is, the safety cover 4 is in the locked state in which the safety cover 4 cannot be opened.

(36) Disposition of Lock Lever 35, First Gear 32, Second Gear 38, Connecting Plate 40, Plunger 42, and Solenoid 41

The lock lever 35, the first gear 32, the second gear 38, the connecting plate 40, plunger 42, and the solenoid 41 are disposed on the same surface which is bilaterally symmetric. Therefore, when an external force is added to the lock lever 35 in the up and down directions, a force for movement in the right and left directions does not occur and only a tensile force is generated in the connecting plate 40. Therefore, an operation is stabilized and it is possible to provide the interlock unit with high reliability. When the right and left width of the interlock unit 26 is set to be small, the first support shaft 31 and the second support shaft 37 can be shortened. Therefore, it is possible to reduce stress, appropriate miniaturization can be achieved, and it is possible to realize the interlock unit 26 with high reliability.

(37) EMC Countermeasures

The safety cover 4 is configured to be rotatable around the cover support shaft 28. Therefore, when the safety cover 4 is formed of a resin, it is difficult to electrically ground the lock receiving means 25 or the lock receiving base 30 provided in the safety cover 4 since it is necessary to connect an earth line. Since the lock lever 35 or the connecting drive member are pivotable components, the lock lever 35 or the connecting drive member have a structure which is difficult to electrically ground.

Accordingly, as well as the lock lever 35, the lock receiving means 25, the lock receiving base 30, structure components included in the interlock unit 26 including the case 47 are also formed as components molded of a resin other than metal components. Therefore, electro magnetic interference (EMI) is not given therearound and electro magnetic susceptibility (EMS) is improved, whereby it is possible to provide the highly reliable automated analyzer with excellent electro magnetic compatibility (EMC) capable of achieving a reduction of noise mixing even when a cable or the like in which a minute signal passes is disposed near the interlock unit 26.

(38) Mounting Surface and External Force Working Surface

Next, the preferred disposition of the mounting bracket 59, the casing frame 55, and the mounting seats 67, 67 of the interlock unit 26, will be described with reference to FIGS. 13 and 4.

FIG. 13 is a side view illustrating the locked state of the interlock unit. As illustrated in FIG. 13, since the mounting seats 67, 67 of the case 47 are provided almost immediately below the lock receiving means 25 provided in the safety cover 4, the mounting bracket 59 is also provided almost immediately below the lock receiving means 25. Accordingly, when the user adds an upward external force to open the safety cover 4 in the locked state, the external force is transmitted from the lock part 34 engaging with the lock receiving means 25 to the left side case 47a and the right side case 47b via the first support shaft 31 and is further transmitted to the mounting bracket 59 via the mounting seats 67, 67. Here, since the lock receiving means 25, the mounting seats 67, 67 and the mounting bracket 59 are disposed on substantially the same surface vertically, the external force is applied as a tensile load to the mounting bracket 59 and a bending moment is not generated. Accordingly, when an upward external force is received, an out-of-plane deformation force for moving the interlock unit 26 in the front and rear directions is not applied. Therefore, even when the external force is received, the interlock unit 26 is stable. Further, since the mounting bracket 59 is mounted on the casing frame 55 as in FIG. 4, the external force is not transmitted to the work surface 22 and does not cause deformation of the work surface 22. Since the upward external force is transmitted to the robust casing frame 55 via the mounting bracket 59, it is possible to provide the automated analyzer with large support rigidity and high reliability.

(39) Capping Effect of Upper Surface Case 47c

Next, a load applied to the left side case 47a and the right side case 47b will be described with reference to FIG. 14. FIG. 14 is a rear view of the locked state of the interlock unit. An upward load is generated in the lock lever 35 via the lock receiving means 25 when an operator attempts to open the safety cover 4 in the locked state. Thus, the load is applied to the first support shaft 31. The first support shaft 31 is molded of a resin to be integrated with the left side case 47a, is fitted in the first support bearing part 63 which is the recessed part forming the distal end in the right side case 47b, and thus serves as a so-called beam. Here, when an upward load is applied to the first support shaft 31 and a fastening force lacks between the left side case 47a and the right side case 47b, the left side case 47a and the right side case 47b are bent in a mutually opening direction, as illustrated in FIG. 14 because the left side case 47a and the right side case 47b are formed of a resin. Then, the distal end of the first support shaft 31 deviates from the fitting of the recessed part and the first support shaft 31 becomes a cantilever shape. Compared to the beam form, bending stress occurring in the root of the first support shaft 31 becomes large and there is concern of breakage.

Accordingly, as illustrated in FIG. 11, the upper surface case 47c is configured to cover the upper surfaces of the left side case 47a and the right side case 47b and the cross sectional shape of the upper surface case 47c is set as the U-shaped case opening prevention part 91 of which a lower surface is opened with large dimensions by providing gaps from the right and left widths of the left side case 47a and the right side case 47b. That is, the case opening prevention part 91 is fitted from the outside to prevent deformation of the upper surfaces of the left side case 47a and the right side case 47b in the right and left outside directions. Therefore, when an upward load is applied to the lock lever 35, the left side case 47a and the right side case 47b are not opened outside and the distal end of the first support shaft 31 does not deviate from the first support bearing part 63 which is the recessed part provided in the right side case 47b. Therefore, the first support shaft 31 does not become a cantilever and there is no breakage. It is possible to provide the automated analyzer with high rigidity and high reliability.

In this way, by mounting the upper surface case 47c, it is possible to obtain the rigidity between the left side case 47a and the right side case 47b. Therefore, the left side case 47a and the right side case 47b may be fitted by snap fitting for assembly without being mutually screwed.

(40) Acute Angle Effect of Lock Receiving Means 25

Next, the detailed shapes of the lock part 34 and the lock receiving means 25 will be described with reference to FIGS. 15 and 16. FIGS. 15 and 16 are cross sectional views taken along the line A-A illustrating the locked state of the lock means 26 of the safety cover 4, and is a partially enlarged view near a lock lever part.

In FIG. 15, the upper surface of the lock receiving means 25 is a slope surface of which a height increases away from the front surface of the safety cover 4, and an angle $\theta1$ formed between the vertical surface and the upper surface of the lock receiving means 25 is an acute angle less than 90 degrees. Further, for a surface close to the supporting part 33 of the lock part 34 which is a part of the lock lever 35, an angle formed with the vertical surface in the rising state of the lock lever is substantially equal to $\theta1$ and is an acute angle less than 90 degrees.

That is, since the angle between the lower surface of the lock part 34 and the upper surface of the lock receiving means 25 coming into contact with each other is set as an acute angle, a reaction force generated from the safety cover 4 opened by the user in the locked state works in a direction in which the lock part 34 and the lock receiving means 25 are led in and close. Therefore, the engagement of the lock part 34 and the lock receiving means 25 becomes stronger and the locked state can be reliably maintained.

(41) Effect of Protrusion of the Lock Receiving Means 25

As illustrated in FIG. 16, a protruding part 51 which is smooth upward is provided at the rear end which is the most distant from the front surface of the safety cover 4 of the lock receiving means 25. FIG. 16 illustrates, for example, a case in which a voltage applied to the solenoid 41 decreases, the lock lever 35 is not pivoted up to the rising state of the lock lever 35 illustrated in FIG. 15 and is pivoted up to an angle θ2 less than the right angle. In this case, the protruding part 51 comes into contact with a semicylindrical part on the rears surface side of the lock part 34, a reaction force is oriented in a direction perpendicular to a contact surface upon opening the safety cover 4 and works in a direction away from the first support shaft 31 by a radius R, and a moment is produced in a direction in which the lock lever 35 is close to the lock receiving base 30. Accordingly, the lock lever 35 does not deviate and the locked state can be maintained.

(42) T-Type Shape Effect

In the embodiment, the lock lever 35 is configured as the lock lever 35 that has a substantial T-type shape in which a pair of lock parts 34 extend to both sides from the supporting part 33 in the substantial L-type shape in which the lock part 34 extends to one side from the supporting part 33. Operations and effects of the substantial L-type shape and the substantial T-type shape will be described with reference to FIGS. 17A and 17B.

FIG. 17A illustrates the lock lever 35 with the substantial L-type shape in which the lock part 34 protrudes only to the left side from the supporting part 33 in a state in which a reaction force F is applied when the safety cover 4 is opened. Since the reaction force F is applied to only the left lock part 34, a bending moment M for bending the lock lever 35 to the right is produced and the lock lever 35 is bent to the right and moved to the right. Therefore, the engagement of the lock part 34 and the lock receiving means 25 easily deviates. Further, since tensile stress is applied to the supporting part 33 due to the reaction force F and bending stress is produced by the bending moment M, the stress on the lock lever 35 becomes large.

FIG. 17B illustrates a state in which the reaction force F is applied to the lock lever 35 with the substantial T-type shape according to the embodiment when the safety cover 4 is opened.

The reaction force F is applied equally (F/2) to the pair of right and left lock parts 34. Since the reaction force (F/2) is applied to the supporting part 33 bilaterally symmetrically, a force for movement to one of the right and left does not occur and the lock lever 35 becomes stable. When the reaction force (F/2) works at a position deviated from the bilateral symmetric position, a moment produced in the supporting part 33 is merely a product of a deviation amount from the symmetric position and the reaction force. Therefore, the bending moment is small and only the tensile force mostly works.

In the lock lever 35 with the substantial T-type shape, the tensile force by the reaction force F is dominant in the supporting part 33 and the bending moment is small. Accordingly, there are advantageous effects in which the stress occurring in the lock lever 35 is less than that of the lock lever 35 with the substantial L-type shape illustrated in FIG. 17A even when the reaction force F is the same, and it is possible to provide the automated analyzer with high reliability.

(43) Dimensions of Lock Lever 35

A preferred dimension relationship between the lock parts 34 of the lock lever 35 and the lock receiving means 25 will be described with reference to FIGS. 18A and 18B. FIGS. 18A and 18B are schematic views illustrating a state in which an upward external force upon opening the safety cover 4 is applied in a state in which interlock acts and the safety cover 4 is fully shifted to the left. In FIGS. 18A and 18B, L1 indicates an internal width of the lock receiving means 25. L2 indicates a width of a straight part of a side of the lower surface of the lock part 34 coming into contact with the lock receiving means 25 and indicates a width of a straight part up to the R part at the distal end of the lock part 34. A difference between FIGS. 18A and 18B is that because of the large distal end R of the lock part 34, L2 is small, the width L1 of the lock receiving means 25 is large, and a relationship of L1>L2 is satisfied in FIG. 18A. In FIG. 18B, because of a small distal end R' of the lock part 34, L2 is large, the width L1 of the lock receiving means 25 is small, and a relationship of L1<L2 is satisfied.

In FIG. 18A, when the external force F is applied to the lock lever 35 and a load is divided equally and applied by F/2 to the right and left lock receiving means 25, the illustrated left lock receiving means 25 comes into contact with the distal end R of the lock part 34. Therefore, the left lock receiving means 25 is shifted upward along the distal end R and moves while being deformed, and the lock becomes off in some cases. On the other hand, as illustrated in FIG. 18B, when the relationship of L1<L2 is satisfied, the left lock receiving means 25 is not shifted up to the position of the distal end R' and comes into contact with the straight part of the lower surface of the lock part 34. Therefore, when the load F is applied, the lock receiving means 25 is not deviated and it is possible to provide the analyzer with high reliability.

The state in which the safety cover 4 is shifted to the left has been described above. Conversely, when the safety cover 4 is shifted to the right, the same operation is performed due to the bilateral symmetry.

(44) Overrun Effect

FIG. 20 is a cross sectional view taken along the line A-A in the locked state of the safety cover interlock means and a partially enlarged view near the lock lever part, and illustrates a state in which the operator applies a force to the handle 27 of the safety cover 4 to the front so that the safety cover 4 is bent and moved to the front. Since the lock receiving means 25 is also moved to the front along with the safety cover 4, it is preferable to pivot the lock part 34 more by an angle θ3 to the front than in the rising state of the lock lever 35. Even when the safety cover 4 is in a bent state, the lock part 34 and the lock receiving means 25 reliably engage. This configuration can be realized by appropriately selecting an operation amount of the plunger 42 and the dimensions of the first gear 32 and the second gear 38 so that the lock lever 35 is pivoted more by the angle θ3 from the rising state of the lock lever 35 when the plunger 42 of the solenoid 41 is sucked at a maximum.

(45) Disposition of Interlock Unit 26

In the embodiment, the interlock unit 26 is disposed in the middle of the front surface of the safety cover. Therefore, when the interlock unit 26 works and the safety cover is locked, the middle is engaged. Therefore, even when a force in an opening direction is applied to the vicinity of the right and left side surfaces of the safety cover, a body cover is rarely deformed and bent and a gap is opened between the body and the lower end of the body cover.

The lock receiving means 25 is configured to protrude backward from the inside of the safety cover 4 and the lock lever 35 is pivoted to be close in front from the inside on the front surface of the safety cover 4 from the work surface 22 and works on and locks the lock receiving unit 25. Therefore, a protrusion amount of the lock receiving means 25 is reduced and miniaturization is achieved, and the lock receiving means 25 can have a smooth shape which is not a hook shape or a flange shape.

Further, the lock receiving means 25 is disposed to the rear of the handle 27. Therefore, when the operator applies a force in the opening direction to the handle 27 during the lock, an operation of opening the safety cover 4 is inhibited reliably, which is therefore appropriate.

When the lock means 26 does not work, the lock lever 35 is flush with the work surface 22. Therefore, when the safety cover 4 is opened, the claw of the lock lever which has a hook shape or a flange shape does not protrude from the work surface 22. Therefore, there is no interference when the work surface 22 is cleaned using a cleaning tool such as a cloth or a brush.

Further, the recessed part accommodating the lock lever 35 of the upper surface cover 76 has a part with the bottom surface and prevents a liquid or foreign matters from falling from the recessed part.

(46) Drain Structure

The liquid guide means is provided in the drive connecting member connecting the actuator to the lock lever and the drain port is provided in the case. Therefore, a liquid such as a water or a reagent invading into the case from the gap around the lock lever provided in the upper surface cover 76 is drained to the outside of the case from the drain port via the liquid guide means, and thus does not reach the actuator provided in the lower end of the case. Therefore, it is possible to provide the interlock unit which has a simple structure, can be miniaturized, and has high reliability and the automated analyzer including the interlock unit.

(47) Lock Fault Releasing

An example of an operation of releasing the lock mechanically and opening the safety cover 4 in a case in which the interlock unit 26 remains in the locked state, for example, because of non-releasing of the energization caused by a fault of a circuit will be described. FIG. 21 is a cross sectional view illustrating an operation when releasing an abnormal lock state of the interlock unit.

In the embodiment, there is no step or protrusion which is an obstacle between a lower surface of handle 94 of the handle on the front surface of the safety cover 4 and the work surface 22, and a release piece 95 can be inserted from the front until the release piece 95 comes into contact with the lock lever 35 from the gap between the lower surface of handle 94 of the handle and the work surface 22. When the release piece 95 is further pushed backward, the lock lever 35 is pivoted backward around the first support shaft 31 via the release piece 95 and the lock part 34 is separated from the lock receiving means 25. Therefore, in this state, the safety cover 4 can be opened.

As described above, even when a special mechanical lock releasing mechanism is not included and the interlock unit 26 is broken down and does not operate in the locked state, the lock of the lock lever 35 can be released. Before the broken interlock unit 26 is repaired or exchanged, the safety cover 4 can be opened to switch a reagent, acquire a specimen, or the like.

Here, the foregoing operation is in a situation in which the releasing cannot be performed in the locked state, the lock lever 35 is not anchored and can be pivoted backward in this case.

(48) Exchange of Interlock Unit 26

Next, a configuration in which the broken interlock unit 26 can be easily exchanged even in a case in which the interlock unit 26 is broken down and does not operate in the locked state and the lock lever 35 is fixed and is not moved will be described.

In the embodiment, as illustrated in FIG. 4 or 13, the interlock unit 26 is fixed to the mounting bracket 59 fixed to the casing frame 55 by the mounting screws 61 from the front and is fixed to be detachably mounted via a front surface opening formed in the front surface when the front plate 56 is detached. As illustrated in FIGS. 2 and 3, the interlock unit 26 is disposed near the rear part of the front plate 56 of the casing 21. Therefore, when the front plate 56 is detached, the interlock unit 26 can be easily visually observed. The mounting screws 61 can be mounted within the range of the front surface opening below the work surface so that the mounting screws 61 can be directly viewed from the front surface. Therefore, even when the safety cover 4 is in a closed state, the mounting screws 61 can be detached with the driver 62. Further, when a connected connector 54 supplying electricity to the solenoid 41 is detached while the interlock unit 26 being moved downward in front, the broken interlock unit 26 can be separated in a short time from the casing 21. Since the interlock unit 26 operating normally can also be mounted in a reverse order, it is possible to provide the automated analyzer with good maintenability. When the broken interlock unit 26 is detached, it is needless to say that the safety cover 4 can be opened at this time point.

(49) Vertical Pile Disposition

As described above, as a shape of the interlock unit 26 in which it is easy to detach or mount the interlock unit 26 from the front surface, the interlock unit 26 preferably has a vertically long shape in which dimensions are small in the front and rear directions although dimensions are large in the up and down directions. Conversely, despite a horizontally long shape in which dimensions are large in the front and rear directions, a deep dimension becomes large when the interlock unit 26 is detached. The interlock unit 26 cannot be detached when not moved considerably to the front. The upper surface of the upper surface cover 76 is fitted in the opening of the work surface 22 when the mounting of the interlock unit 26 is completed. Therefore, there is a problem that the interlock unit 26 is easily caught at the time of detaching or mounting.

On the other hand, in the case of the vertically long shape, when the lower side of the interlock unit 26 is moved downward while pivoted in front after the detaching of the mounting screws 61, the fitting of the upper surface and the opening of the work surface 22 is deviated and the interlock unit 26 can easily be detached with a slight movement amount.

That is, the lock lever 35 which is an action member acting on the lock receiving means 25 is provided on the upper surface of the interlock unit 26. The solenoid 41 which is electromagnetic drive means is disposed at the lower end to be vertically long so that an operation direction of the plunger 42 becomes the up and down directions. Further, the first gear 32, the second gear 38, the connecting plate 40, the pull spring 45, and the like are provided between the lock lever 35 and the solenoid 41. The drive connecting means moving in connection is provided so that the lock lever 35 is moved between a non-operating position and an operating position in accordance with energization to the solenoid 41. Therefore, the interlock unit 26 has the vertically long shape in which a depth is overall small and which is large in the up and down directions.

(50) Position at which Solenoid 41 is Mounted

Since the solenoid 41 is disposed below the case 47 to be exposed to the outside air, heat dissipation is better compared to a case in which the solenoid 41 is disposed inside the case 47. Even when the locked state continues for a long time, temperature is not high. Therefore, it is possible to realize the interlock unit 26 with high reliability without being overheated. When the solenoid 41 is disposed on the bottom surface of the case 47, a liquid invading into the case 47 is likely to gather on the bottom surface of the case and invade into the solenoid 41. On the other hand, in the embodiment, the drain ports in contact with the bottom surface of the case 47 are provided at positions higher than the solenoid 41 so that a liquid does not gather inside the case 47. Since the liquid drained from the drain ports 88 and 92 is discharged to the outside of the case, the solenoid 41 does not immerge in the liquid, and thus it is possible to realize the interlock unit 26 with high reliability.

Second Embodiment

A second embodiment of the present invention will be described with reference to FIG. 22. In the drawing, the same reference numerals are given to the same members as those of the first embodiment, and description thereof will be omitted.

FIG. 22 is a perspective view illustrating the second gear 38 used in the interlock unit 26. Differences from the first embodiment are that a lower side of the waterproof rib 82 forming a part of the second gear 38 is a slope side which is not horizontal in the right and left directions and the first waterproof rib end 83 has a sharp shape. With such a shape, a liquid dropping on the waterproof rib 82 reaches the first waterproof rib end 83 along the slope side and drops from the first waterproof rib end 83. When the first waterproof rib end 83 has the sharp shape, the amount of liquid remaining in the first waterproof rib end 83 is smaller than in a case of a horizontal shape. Therefore, it is possible to provide the interlock unit 26 with high reliability in which draining is improved. Alternatively, a first waterproof rib end 83' may slope to one direction of the right and left. In this case, a liquid flows close to the downward sloping inner wall of the side surface of the case along the first waterproof rib end 83' and flows along an inner wall of the side surface of the case by a surface tension of the liquid. Here, since a slope direction of the first waterproof rib end 83' slopes downward in a direction close to the first drain port 88, the draining is further improved, and thus this is preferable.

Third Embodiment

A third embodiment of the present invention will be described with reference to FIGS. 23 to 26.

Differences between the embodiment and the first embodiment are that a lock lever cover part 52 that is projected upward from the work surface 22 and is opened in front, the lock lever 35 does not have a T-type shape and the lock part 34 that has a hook shape at the upper end is provided, and the upper surface of the lock lever 35 is not flush with the work surface 22 in an unlocked state, and the lock lever 35 is at the standby position in the lock lever cover part 52 in the unlocked state.

FIG. 23 is a cross sectional view taken along the line A-A in FIG. 5A in an unlocked state of an interlock unit according to a third embodiment and FIG. 24 is a perspective view. FIG. 25 is across sectional view taken along the line A-A in FIG. 5A of a locked state of the interlock unit and FIG. 26 is a perspective view. In the drawing, the same reference numerals are given to the same members as those of the first embodiment, and description thereof will be omitted.

In the embodiment, the lock receiving means 25 is provided at one position facing the lock lever 35 rather than a pair of right and left lock receiving means 25.

When the connecting shaft 39 is provided integrally with the lock lever 35 and the plunger 42 is sucked to the solenoid 41, the lock part 34 with the hook shape at the distal end of the lock lever 35 is pivoted in front around the first support shaft 31 via the connecting plate 40 and the connecting shaft 39 and engages with the lock receiving means 25. The lock receiving means 25 is provided at one position corresponding to the lock lever 35 rather than the pair of lock receiving means 25.

A waterproof rib 96 is provided in the connecting plate 40 connecting the drive pin 43 of the plunger 42 to the connecting shaft 39 and slopes so that the front side is high and the rear side is low. One end of the rear side is further bent downward and the lower end serves as a waterproof rib end 97. In a fourth case rib 98, a lower end is integrated with the bottom surface of the case 47 and an upper end is disposed in the rear of the connecting plate 40 and in front of the waterproof rib end 97. A drain port 99 is provided between the fourth case rib 98 and a rear lower end part of the case 47.

A liquid invading into the case from the gap around the lock lever 35 flows backward along the slope of the upper surface of the waterproof rib 82, drops on the fourth case rib 98 from the waterproof rib end 97, and drains from the drain port 99 to the outside of the case 47.

In FIGS. 23 and 24, the plunger 42 of the solenoid 41 is moved in a direction of separation from the solenoid 41 by the pull spring 45, the lock lever 35 is pivoted counterclockwise in the drawing around the first support shaft 31, the lock part 34 with the hook shape provided at the upper end of the lock lever 35 is separated from the lock receiving means 25, the lock part 34 and the lock receiving means 25 do not engage, and thus an operator is in an unlocked state in which the safety cover 4 is openable.

In FIGS. 25 and 26, the solenoid 41 is energized and the plunger 42 gets sucked to the solenoid 41 against a tensile force by the pull spring 45. Since the connecting shaft 39 is moved in a direction close to the solenoid 41 via the connecting plate 40, the lock lever 35 is pivoted clockwise in the drawing around the first support shaft 31 and the lock part 34 is moved above the lock receiving means 25. This state is the locked state similar to FIG. 9 in the first embodiment.

In the embodiment, in the unlocked state, the lock lever 35 is not flush with the work surface and the lock lever cover part 52 is in a state in which the lock lever 35 is accommodated in the lock lever cover part 52. A pivoting angle of the lock lever 35 from the unlocked state to the locked state is less than in the first embodiment. Therefore, there is an advantageous effect in which the first gear 32 and the second gear 38 provided in the first embodiment are not necessary, the number of components is small, and thus the configuration is simple.

In the foregoing configuration according to the embodiment, the lock part 34 and the lock receiving means 25 engage at an acute angle, as illustrated in FIG. 15 of the first embodiment, the lock receiving means 25 includes the protruding part 51, as illustrated in FIG. 16, and the lock lever 35 is pivoted more by the angle θ3, as illustrated in FIG. 20. Therefore, as in the first embodiment, the lock part 34 and the lock receiving means 25 can engage more reliably.

In the embodiment, the mechanical lock releasing is possible, as illustrated in FIG. 21, as in the first embodiment. When the front plate 56 is excluded from the casing 21, as illustrated in FIG. 3, it is needless to say that the interlock unit 26 can be detachably mounted.

Fourth Embodiment

A fourth embodiment of the present invention will be described with reference to FIGS. 27A and 27B.

FIG. 27A is a top view of the interlock unit 26 in an unlocked state according to the fourth embodiment of the present invention and FIG. 27B is a cross sectional view taken along the line A-A in FIG. 5A.

Differences between the embodiment and the first embodiment are that a hole IC 100 detecting magnetism is provided on the lower surface of the upper surface cover 76 and, for example, a magnet 101 is provided on the lower surface of the handle of the safety cover 4 and at a position facing the hole IC 100 when the safety cover 4 is closed.

When the safety cover 4 is closed, the hole IC 100 detects magnetism and transmits a signal. When the safety cover 4 is opened, the magnet 101 comes to be distant and the hole IC 100 does not detect magnetism. Therefore, the signal is cut off. With the configuration, opening and closing detection of the safety cover 4 can be embedded in the interlock unit 26. Therefore, it is not necessary to provide an opening and closing detection element separately. A wiring from the hole IC 100 and a wiring from the solenoid 41 can gather in one connector 54. Therefore, the configuration is simple and higher reliability can be achieved.

Fifth Embodiment

A fifth embodiment of the present invention will be described with reference to FIG. 28.

FIG. 28 is a perspective view of an interlock unit according to the embodiment. The embodiment is a modification of the form of the lock lever 35. Differences between the embodiment and the first embodiment are that the shape of the lock lever 35 does not have the substantial T-type shape, two right and left supporting parts 33a and 33b are provided to be symmetric, and the distal ends of the supporting parts 33a and 33b are connected to serve as the lock part 34 extending in the right and left directions. Unlike the lock receiving means 25 which is provided at two bilateral symmetric positions in the first embodiment, the lock receiving means 25 is provided only one position in the middle. When the lock lever 35 rises, working is performed on the lock part 34.

In the embodiment, the safety cover 4 can be locked reliably as in the first embodiment. Therefore, it is possible to provide the automated analyzer with high reliability in which the interlock unit 26 can be easily detached and mounted.

Modification of Fifth Embodiment

A modification of the fifth embodiment of the present invention will be described with reference to FIGS. 29A and 29B.

FIG. 29A is a top view illustrating an unlocked state of an interlock unit according to a modification of the fifth embodiment and FIG. 29B is a cross sectional view taken along the line D-D in FIG. 29A.

As illustrated in FIGS. 29A and 29, the lock lever 35 that has the shape described in the fifth embodiment is provided on the upper surface of the case 47 as the lock lever 35 which is an action member, the solenoid 41 which is an actuator is provided backward on the rear surface of the case 47, the drive connecting means 53 for transmitting a drive force is provided between the action member and the actuator, and the action member, the drive connecting means 53, and the actuator are disposed in a front and rear row. In this case, it is possible to obtain the same advantageous effects as those of the fifth embodiment.

Sixth Embodiment

A sixth embodiment of the present invention will be described with reference to FIG. 30.

Differences between the embodiment and the third embodiment are that the lock receiving means 25 is provided not on the rear surface of the handle 27 of the safety cover 4 but on the rear side of a safety cover front lower part 102 extending downward from the front surface of the handle 27.

In FIG. 30, the lock lever 35 is disposed below the work surface 22. The lock part 34 faces the lock receiving means 25, protrudes toward the rear surface of the safety cover front lower part 102 from the front surface opening of a step part 103 provided between the work surface 22 and the front plate 56 of the casing 21, works on the lock receiving means 25, and locks the safety cover 4. A liquid invading from the periphery of the lock lever 35 flows frontward along the slope of the upper surface of the waterproof rib 96 provided in the connecting plate 40, drops between the inner front surface of the case 47 and a fifth case rib 104 rising from the bottom surface of the case, and is discharged from the drain port 99.

FIG. 31 is a block diagram illustrating a configuration of a part related to a driving operation of the interlock unit according to the embodiment.

A driving signal is transmitted from the host computer 200 that controls an operation of the entire automated analyzer 1 to a driver 201 that drives the solenoid 41, power is supplied to the driver 201, and the solenoid 41 can be driven based on the driving signal from the host computer 200. The door opening and closing detection 202 is connected to power supplies 203 and power is supplied when the safety cover 4 is closed, and power is cut off when the safety cover 4 is opened. A display means 204 can display an operation status of the automated analyzer 1 or display an alarm to inform the operator of the alarm when abnormality is detected.

FIG. 32 is a flowchart illustrating an operation of the interlock unit according to the embodiment.

As illustrated in FIG. 32, the automated analyzer 1 performs the following process when driven. That is, it is determined whether a start switch of the automated analyzer 1 is operated (step S101). When a determination result is NO, the determination of step S101 is repeated until the start switch is operated.

When a determination result is YES in step S101, that is, an instruction to start the process is given, it is determined through the door opening and closing detection 202 whether the safety cover 4 is closed (step S102). When a determination result is NO, the determination of step S102 is repeated until the determination result becomes YES.

Conversely, when a determination result is YES in step S102, that is, the safety cover 4 is closed, it is checked that the safety cover 4 is closed (step S103), the solenoid 41 is energized to lock the safety cover 4 (cover lock) (step S104).

Subsequently, the automated analyzer 1 is driven to analyze a sample (step S105). When the analysis is completed, a stop switch is manipulated to start the stopping process (step S106).

It is determined whether an operation of each part of the automated analyzer 1 is stopped (step S107). When a determination result is NO, the process of step S107 is repeated until the determination result becomes YES.

Conversely, when the determination result is YES in step S107, the energization of the solenoid 41 is shut off (step S108), the process ends. When the lock of the solenoid 41 is released, the safety cover 4 enters an openable state. Therefore, it is possible to acquire, exchange, or supply a sample or a reagent.

Advantageous Effects

The advantageous effects in the foregoing configurations according to the present invention will be summarized.

That is, in the present invention, the lock lever 35 is disposed to face in the front and rear directions in parallel to the work surface 22 when the lock is released. The recessed part in which the lock lever 35 is accommodated upon releasing the lock is provided on the upper surface case 47c flush with the work surface 22. The upper surface of the lock lever 35 has a planar shape and is flush with the work surface 22 to have the smooth shape. Therefore, when the safety cover 4 is opened in the unlocked state, there is no protrusion from the work surface 22, and thus there is no interference when an operator opens the safety cover 4 to clean or exchange the various operating mechanism groups 29, clean the work surface 22, and exchange the reagent bottle 3. A cleaning tool such as a cloth or a brush is not caught when the work surface 22 is cleaned. Therefore, there is an advantageous effect in which it is possible to provide the automated analyzer which can be easily used.

In the present invention, the lock receiving means 25 provided to protrude to the rear surface of the front side of the safety cover 4 or the handle 27 is formed in the smooth shape rather than the hook shape. Therefore, since a cleaning tool such as a cloth or a brush is not caught, there is an advantageous effect in which it is possible to provide the automated analyzer which can be easily used.

The lock lever 35 has the substantial T-type shape in which the lock parts 34 protrude to the right and left from the supporting part 33. When the safety cover 4 attempts to be opened, the reaction force F produced in the lock lever 35 is applied to the supporting part 33 in the bilateral symmetry. Therefore, a force moving the lock lever 35 to any of the right and left is not produced, and thus the lock lever 35 becomes stable. The tensile stress is dominant in the supporting part 33 and the bending moment is small. Therefore, the stress is small, and thus there is an advantageous effect in which it is possible to provide the automated analyzer 1 with high reliability.

The width L2 of the straight part of the side of the lower surface of the lock part 34 coming into contact with the lock receiving means 25 is greater than the inner width L1 of the lock receiving means 25. Thus, when an upward external force is applied in an opening direction in the state in which the safety cover 4 is shifted to the right or left, the lock is not deviated, and thus there is an advantageous effect in which it is possible to provide the automated analyzer 1 with high reliability.

Since the lock part 34 is further pivoted more by the angle θ3 in front than the rising state of the lock lever 35, there is an advantageous effect in which it is possible to provide the automated analyzer 1 with high reliability in which the engagement of the lock part 34 and the lock receiving means 25 is reliable even in the bent state of the safety cover 4 and the safety cover 4 can be closed reliably in the locked state.

The recessed part 49 which is provided in the upper surface case 47c and accommodates the lock part 34 is configured to have the bottom surface and thus prevent a liquid or foreign matters from falling from the recessed part 49. Therefore, there is an advantageous effect in which it is possible to provide the automated analyzer with a simple configuration and high reliability.

The lock lever 35 and the drive connecting means 53 are configured as the interlock unit 26 covered with the case 47 molded of a resin. Therefore, assembly or exchanging work is easy on the basis of units, and thus there is an advantageous effect in which it is possible to provide the automated analyzer with a simple configuration and high reliability.

The lock lever 35 which is an action member is provided on the upper surface of the case 47 of the interlock unit 26 to be rotatable, the solenoid 41 which is an actuator is provided on the lower surface of the case 47, the drive connecting means 53 for transmitting a drive force is provided between the action member and the actuator, and the action member, the drive connecting means 53, and the actuator are disposed in a front and rear row. Therefore, a projection area when viewed from the upper side can be set to be small, the casing 21 can be appropriately miniaturized in the configuration, and the dimensions in the front and rear directions can be set to be small. Therefore, there is an advantageous effect in which the interlock unit 26 can be disposed along the front plate 56 in the rear part near the front plate 56 of the casing 21.

In the case 47, the range of the rising side wall of the supporting shaft that supports the gear or the spring is narrower than the width of the upper surface case mounting parts 69a and 69b and the length of the supporting shaft that supports the gear or the spring is shortened. Therefore, it is possible to reduce stress occurring when a load is applied, and it is possible to realize the interlock unit with high reliability.

The solenoid 41 which is the electromagnetic drive means is provided below the case 47 to be exposed to the outside air. Therefore, heat dissipation is better compared to a case in which the solenoid 41 is disposed inside the case. Even when the solenoid 41 continues to be energized, overheating does not occur. Therefore, it is possible to realize the interlock unit with high reliability.

The drain port discharging a liquid to the outside of the case 47 and the liquid guide means for guiding the liquid to the drain port are provided when a liquid such as a reagent flows and invades into the case 47 from the gap of the upper surface of the case 47. Therefore, there is an advantageous effect in which no liquid flows in the solenoid 41, and thus it is possible to provide the automated analyzer with high reliability.

The case 47 includes the left side case 47a, the right side case 47b, and the upper surface case 47c which are each molded of a resin. The rotational support shafts 31 and 37 of the gears or the spring hook 44 are molded integrally with the case. Since the first gear 32 and the lock lever 35 are molded integrally and the second gear 38 and the waterproof rib 82 are molded integrally, there is an advantageous effect in which the number of components can be reduced and the configuration can be realized at low cost. Further, by covering the outside of the upper surfaces of the left side case 47a and the right side case 47b with the case opening prevention part 91 in which the outer circumference of the upper surface case 47c extends downward, it is possible to prevent deformation of the left side case 47a and the right side case 47b in the opening direction even when a load is applied upward to the lock lever 35. Accordingly, since the first support shaft 31 is prevented from becoming a cantilever and being damaged, there is an advantageous effect in which it is possible to provide the automated analyzer with high reliability. Further, since the rigidity of the left side case 47a and the right side case 47b can be obtained by the case opening prevention part 91 of the upper surface case 47c, the left side case 47a and the right side case 47b can be engaged to be assembled by only so-called snap fitting without being screwed and the configuration can be realized at low cost.

When the lock lever 35 enters an abnormal state without being returned in the locked state, the release piece 95 can be inserted into the gap between the lower side of the safety cover 4 and the work surface 22 and the lock lever 35 can be pressed from the front to pivot backward the lock lever 35, so that the lock is released and the safety cover 4 can be opened. Accordingly, even when the interlock unit is broken down, the abnormal lock can be released easily. Therefore, it is possible to provide the automated analyzer which is easily used.

Since the interlock unit 26 is screwed to the mounting bracket 59 mounted on the casing frame 55 from the front, the mounting and detaching are easy and the assembly and maintenability are good. Further, when the lock lever 35 is anchored and enters a non-returned state, the lock lever 35 is detachably mounted via the front surface opening formed in the front surface when the front plate 56 of the casing is detached. Therefore, since the screws are detached from the front side and the interlock unit 26 can be detached downward in front, the unit can be exchanged in a short time and the maintenability is good.

The drive source connected to the drive connecting means 53 is the solenoid 41, but the present invention is not limited to the solenoid. The drive source may be a motor such as a stepping motor, a direct-current motor, or an alternating-current motor. For example, deceleration means such as a spur gear or a worm gear may be further provided between the motor and the lock lever. Alternatively, the actuator operated by compressed air or hydraulic pressure may serve as the drive source.

The lock lever 35 pivoting around the shaft in the right and left direction has been exemplified as the action member, but the present invention is not limited to the lock lever. An action member that is repeatedly projected and withdrawn in the up and down directions, the right and left directions, or the front and rear directions may be used, or a rotational member that rotates around a rotational shaft in the up and down directions may be used.

The unit mounting surface 93 of the mounting bracket 59 and the mounting seats 67, 67 of the interlock unit 26 extend in the up and down directions, and the mounting screws 61 are mounted and detached in front in the horizontal direction, as described above. However, the present invention is not limited to such as form. For example, the unit mounting surface 93 and the mounting seats 67, 67 may slope backward at the upper end than at the lower end and a driver may be inserted obliquely from the upper side to mount or detach screws.

<Supplements>

The present invention is not limited to the above-described embodiments and includes various modifications. For example, the above-described embodiments have been described in detail to facilitate understanding of the present invention and all the above-described configurations may not be included. Some of the embodiments may be replaced with configurations of the other embodiments. The configurations of the other embodiments can also be added to some of the embodiments. Some of the configurations of the embodiment may be omitted.

REFERENCE SIGNS LIST

1: automated analyzer
2: reagent disk
3: reagent bottle
4: safety cover
5: sample conveying means
6: sample dispensing means
7: chip rack (sample dispensing chip and reaction container supply means)
8: sample dispensing chip and reaction container conveying means
9: incubator
10: sample dispensing chip
11: sample dispensing chip buffer
12: sample dispensing chip and reaction container disposal hole
13: reaction solution stirring means
14: reaction container
15: reagent dispensing pipette
15a: reagent dispensing position
16: stirring means
17: washing means
18: reaction solution suction nozzle
19: detection unit
20: reagent bottle loading port
21: casing
22: work surface
22a: work surface opening
23: safety cover front surface
24: safety cover front side
25: lock receiving means
26: lock means (interlock unit)
27: handle
28: cover support shaft
29: various operating mechanism groups
30: lock receiving base
31: first support shaft
32: first gear
33: supporting part
34: lock part
35: lock lever
36: cover part
37: second support shaft
38: second gear
39: connecting shaft
40: connecting plate
41: solenoid
42: plunger
43: drive pin
44: first spring hook
45: pull spring
46: second spring hook
47: case
47a: right side case 47b: left side case
47c: upper surface case
47d: rib around case
48: cylindrical part
49: recessed part
50: bottom surface
51: protruding part
52: lock lever cover part
53: drive connecting means
54: connector
55: casing frame
56: front plate
57: side plate
58: rear plate
59: mounting bracket
60: mounting groove
61: mounting screw
62: driver
63: first support bearing part
64: second support bearing part
65, 65a, 65b: side wall part
66: solenoid mounting part
67: mounting seat
68: reinforcing rib
69: upper surface case mounting part
70a, 70b: step
71: snap fit claw
72: receiving part
73: snap fit claw
74: receiving part
75: through hole
76: upper surface cover
77: snap fit claw
78: drive pin hole
79: connecting shaft hole
80: slope
81: second gear shaft hole
82: waterproof rib
83: first waterproof rib end
84: second waterproof rib end
85: first case rib
86: second case rib
87: gutter
88: first drain port
89: third case rib
90: first gear shaft hole
91: case opening prevention part
92: second drain port
93: unit mounting surface
94: lower surface of handle
95: release piece
96: waterproof rib
97: waterproof rib end
98: fourth case rib
99: drain port
100: hole IC
101: magnet
102: safety cover front lower part
103: step part
104: fifth case rib
105: screw hole
106: third case rib end
107: mounting screw
108: gap
200: host computer
201: driver
202: door opening and closing detection
203: power supply
204: display means

The invention claimed is:

1. An interlock capable of preventing rotation from a closed position to an open position of a cover that is provided so as to cover an upper part of a work surface, which is an upper surface of a casing, and is pivotally supported to be rotatable in a vertical direction between the closed position and the open direction around a support shaft provided on one side of the casing,
the interlock comprising:
a hollow case having a rectangular parallelepiped shape disposed at a position adjacent to an inner side surface of the casing, below an end part opposite to the support shaft at the closed position of the cover;
a latch provided on an upper surface of the case, supported to be movable between a non-operating position and an operating position, and engaged with a protrusion provided on the cover at the operating position to inhibit the cover from rotating toward the open position;
an electromagnetic drive provided below the latch to drive the latch;
a drive connector for driving the latch by connecting the latch and the electromagnetic drive and transmitting an operation of the electromagnetic drive to the latch;
a drain port provided to be opened to the outside below the case; and
a liquid guide that is provided so as to extend in a lateral direction through at least an upper part of the electromagnetic drive, and guides a liquid that enters into the case from the upper surface of the case to the drain port.

2. The interlock according to claim 1, wherein the liquid guide is provided integrally with the drive connector.

3. The interlock according to claim 1, wherein the latch is a lock lever that is pivotally supported to be rotatable between the non-operating position and the operating position, the electromagnetic drive includes a solenoid coil which is an electromagnet; and
a plunger which is sucked when the solenoid coil is energized, the drive connector includes a first gear formed integrally with the lock lever;
a second gear disposed below the first gear and engaged with the first gear to rotate; and
a connecting plate for connecting the second gear and the plunger, and the liquid guide includes a waterproof rib which is a partial cylindrical member disposed in a nesting shape and coaxially rotates with the second gear, and extends in a direction approaching an inner wall of a side surface of the case from the second gear;
a first case rib which is a partial cylindrical member extending in a direction approaching the waterproof rib from a left side surface or a right side surface of the case and having a radius larger than that of the waterproof rib;
a second case rib which is a partial cylindrical member extending in the direction approaching the waterproof rib from the left side surface or the right side surface of the case and having a radius smaller than that of the waterproof rib;
wherein the liquid guide includes:
a first liquid guide that guides a liquid dropped into the case from a rear end of the waterproof rib up to a first drain port for draining the liquid to the outside of the case; and a second liquid guide that guides a liquid dropped into the case from a front end of the waterproof rib up to a second drain port for draining the liquid to the outside of the case.

4. The interlock according to claim 1, wherein the case is molded of a resin.

5. An automated analyzer, comprising:

a casing that accommodates an analyzer for analyzing a specimen;

a cover that covers an upper part of a work surface, which is an upper surface of the casing, and is pivotally supported to be rotatable between a closed position and an open position opened upward around a support shaft provided on one side of the casing; and the interlock according to claim 1.

* * * * *